US008901408B2

(12) United States Patent
Nakayama

(10) Patent No.: US 8,901,408 B2
(45) Date of Patent: Dec. 2, 2014

(54) ELECTRONIC KEYBOARD MUSICAL INSTRUMENT

(75) Inventor: Tadashi Nakayama, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 183 days.

(21) Appl. No.: 13/357,552

(22) Filed: Jan. 24, 2012

(65) Prior Publication Data

US 2012/0204705 A1 Aug. 16, 2012

(30) Foreign Application Priority Data

Feb. 16, 2011 (JP) ................................. 2011-030570

(51) Int. Cl.
*G01P 3/00* (2006.01)
*G10H 1/02* (2006.01)
*G10H 1/46* (2006.01)
*G10H 1/32* (2006.01)

(52) U.S. Cl.
CPC ........... *G10H 1/46* (2013.01); *G10H 2250/041* (2013.01); *G10H 1/32* (2013.01); *G10H 2210/301* (2013.01)
USPC ................... 84/626; 84/633; 84/662; 84/665; 84/718; 84/719

(58) Field of Classification Search
None
See application file for complete search history.

(56) References Cited

U.S. PATENT DOCUMENTS 7,002,068 B2 2/2006 Koseki et al.
7,514,625 B2 * 4/2009 Suzuki ............................ 84/723
7,745,719 B2 * 6/2010 Suzuki ............................ 84/625
7,968,788 B2 * 6/2011 Shinjo et al. .................... 84/743
8,017,849 B2 * 9/2011 Tajima et al. ................... 84/604
8,039,725 B2 * 10/2011 Kato et al. ...................... 84/744
8,084,680 B2 * 12/2011 Kato et al. ...................... 84/743
8,338,688 B2 * 12/2012 Shinjo ............................. 84/719
2009/0241756 A1 * 10/2009 Tajima et al. .................. 84/604
2010/0192756 A1 * 8/2010 Kato et al. ...................... 84/744

FOREIGN PATENT DOCUMENTS

EP 1357538 10/2003
JP 203316358 11/2003
JP 2009244713 10/2009

OTHER PUBLICATIONS

English Abstract for JP2003316358 published Nov. 7, 2003 by Yamaha Corporation.
English Abstract for JP2009244713 published Oct. 22, 2009 by Yamaha Corporation.
English machine translation for JP2009244713 published Oct. 22, 2009 by Yamaha Corporation.

* cited by examiner

*Primary Examiner* — Marlon Fletcher
(74) *Attorney, Agent, or Firm* — David W. Victor; Konrad Raynes Davda & Victor LLP

(57) ABSTRACT

An electronic musical instrument has a front side, back side, right side, and left side with respect to a perspective of a performer of the musical instrument, and comprises: a planar surface having a first speaker positioned on the front side and the left side, a second speaker positioned on the front side and the right side, and a third speaker positioned on the back side; a first localized sound processing section receives left and right channel signals of tone signals assigned as first localized sounds and produces sound signals to the first speaker, the second speaker and the third speaker to form a first sound image; and a second localized sound processing section receives left and right channel signals of tone signals assigned as second localized sounds and produces sound signals to the first speaker, the second speaker and the third speaker to form a second sound image.

33 Claims, 9 Drawing Sheets

ELECTRONIC KEYBOARD MUSICAL INSTRUMENT

CROSS-REFERENCE TO RELATED FOREIGN APPLICATION

This application is a non-provisional application that claims priority benefits under Title 35, United States Code, Section 119(a)-(d) from Japanese Patent Application entitled "ELECTRONIC KEYBOARD MUSICAL INSTRUMENT" by Tadashi Nakayama, having Japanese Patent Application Serial No. 2011-030570, filed on Feb. 16, 2011, which Japanese Patent Application is incorporated herein by reference in its entirety.

BACKGROUND OF THE INVENTION

1. Field of the Invention

The present invention relates to an electronic keyboard musical instrument.

2. Description of the Related Art

An electronic keyboard musical instrument that simulates a grand piano (hereafter referred to as an "electronic grand piano") generates performance sounds based on waveform data stored therein and does not require strings and other components indispensable for an acoustic grand piano. Therefore, the electronic grand piano can be built with a shorter casing in the depth direction (i.e., the length in a direction away from the keyboard side), compared to a grand piano, whereby space-saving can be achieved, in other words, the space for placing the instrument can be reduced. For the electronic grand piano having such a short dimension in the depth direction, for example, Japanese Patent No. 3928468 and Japanese Laid Open Application 2009-0244713 describe technologies to bring the depth feeling of performance sounds heard by the performer at his or her performing position to be equal to that of a grand piano.

These Japanese patent applications describe technologies in which sounds of a grand piano are sampled at multiple points by a plurality of microphones, and the sounds are reproduced by loudspeakers disposed in the same arrangements as those of the microphones used for sampling. Reproduction of sounds to be generated by one of the loudspeakers located at the back position is delayed, and the sound volume of the sounds is made smaller, compared to sounds to be reproduced by those of the loudspeakers located at the front position, whereby a depth feeling similar to that of a grand piano can be given to the performer.

SUMMARY

Provided is an electronic keyboard musical instrument comprising: a keyboard having a plurality of keys, and outputting tone information corresponding to depression of the keys; a casing having a planar region defined by a surrounding wall, expanding in a direction from a front side to a back side and from a right side to a left side with respect to the keyboard as viewed from a performer depressing the keys; at least three speakers that are disposed in the planar region of the casing, and output tones corresponding to tone signals based on depression of the keys by the performer, wherein the at least three speakers include at least two first speakers disposed on the left and right sides of the front side of the electronic keyboard instrument as viewed from the performer, and at least one second speaker disposed on the back side as viewed from the performer separated from the first speakers; a tone signal generation device that generates stereophonic tone signals according to tone information outputted from the keyboard; and a signal processing device that processes the stereophonic tone signals generated by the tone signal generation device according to the arrangement of each of the at least three speakers, respectively, and outputs the processed signals to corresponding ones of the speakers, wherein the signal processing device rendering processing on at least one of left channel signals and right channel signals composing the stereophonic tone signals such that a combination of at least a delay, a volume level and a phase of each of the signals to be outputted respectively to the at least three speakers has a specified relation with respect to another of the signals, so as to form sound images outside a region surrounded by the at least three speakers, without depending on listening positions.

Further provided is an electronic musical instrument having a front side, back side, right side, and left side with respect to a perspective of a performer of the musical instrument, comprising: a planar surface having a first speaker positioned on the front side and the left side, a second speaker positioned on the front side and the right side, and a third speaker positioned on the back side; a first localized sound processing section for receiving left and right channel signals of tone signals assigned as first localized sounds and producing sound signals to at least two of the first speaker, the second speaker and the third speaker to form a first sound image; and a second localized sound processing section for receiving left and right channel signals of tone signals assigned as second localized sounds and producing sound signals to at least two of the first speaker, the second speaker and the third speaker to form a second sound image.

Further provided is a method for producing sounds from an electronic musical instrument having a front side, back side, right side, and left side with respect to a perspective of a performer of the musical instrument, comprising: receiving left and right channel signals of tone signals assigned as first localized sounds; processing the received left and right channel signals assigned as the first localized sounds to produce sound signals to at least two of a first speaker, a second speaker and a third speaker on a planar surface to form a first sound image, wherein the first speaker is positioned on the front side and the left side, the second speaker positioned on the front side and the right side, and the third speaker positioned on the back side; receiving left and right channel signals of tone signals assigned as second localized sounds; and processing the received left and right channel signals assigned as the second localized sounds to produce sound signals to at least two of the first speaker, the second speaker and the third speaker to form a second sound image.

DETAILED DESCRIPTION

Figure 1:
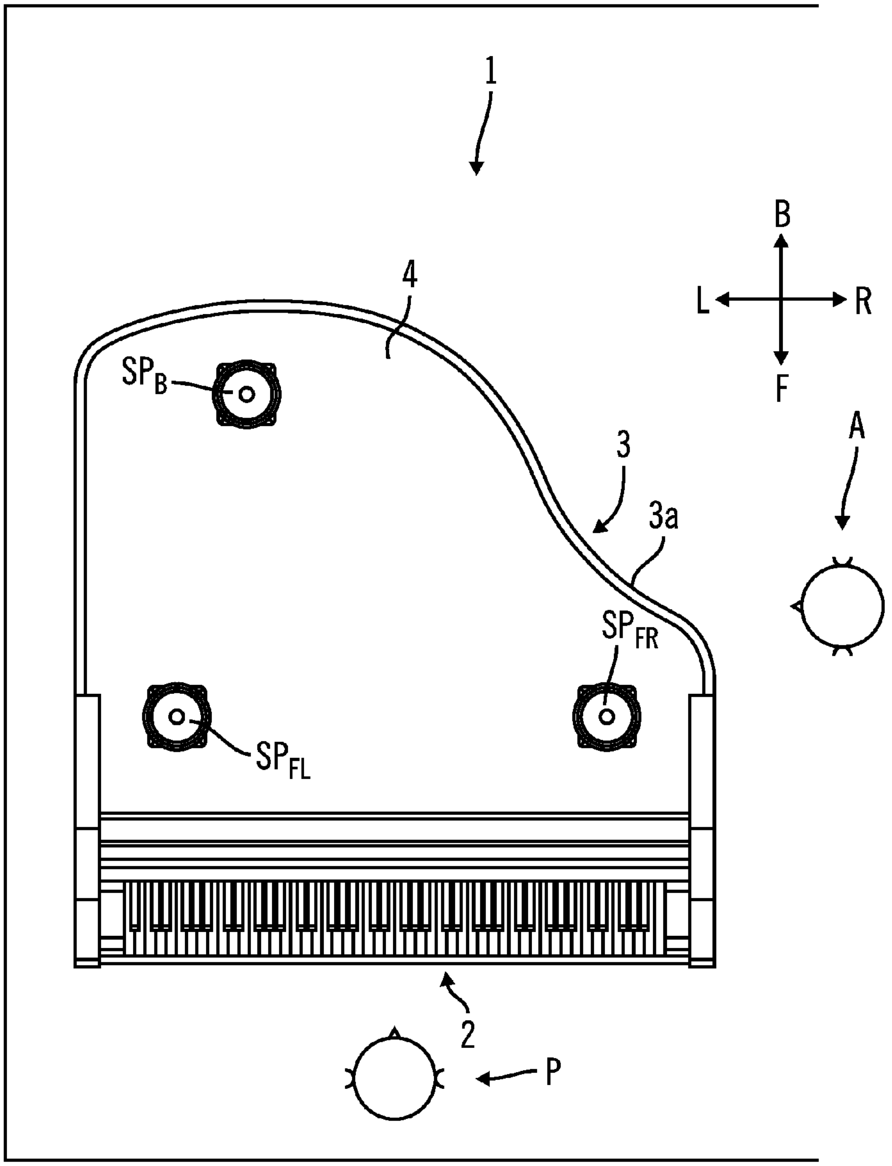
FIG. 1 is a schematic top plan view of an electronic grand piano that is an embodiment of an electronic keyboard musical instrument of the invention.

Normally, audiences who audibly perceive (hear) performance sounds created by a grand piano in a concert or the like would hear the performance sounds at positions angled generally at 90 degrees with respect to the performer's orientation to the casing of the grand piano. The technologies described in the aforementioned Japanese patent applications do not consider audible perception of performance sounds by audiences at all. Therefore, according to the patent documents described above, although a depth feeling of performance sounds can be given to the performer by delaying sounds for matching the time periods of the sounds reaching the performer, there is a problem in that the audiences perceive the performed sounds as being mismatched without having any expansion in their sound images.

The described embodiments solve the problem described above by providing an electronic keyboard musical instrument that enables both of a performer and audiences located at different listening positions to perceive a large planar sound image similar in size to that of a grand piano, exceeding the arrangement of loudspeakers on the electronic keyboard musical instrument.

In the described embodiments, electronic keyboard musical instrument stereophonic tone signals generated by tone signal generation based on depression of keys of a keyboard are processed by a signal processing device according to disposed positions of at least three speakers disposed within a planar region of a casing and outputted to corresponding ones of the speakers. At least two first speakers are disposed on the left and right sides of and on a front side as viewed from the performer, and at least one second speaker is disposed on a back side separated from the speakers disposed on the left and right sides as viewed from the performer. In this way, a specified sound image is formed by the sounds outputted from the at least three speakers disposed within the planar region of the casing. Here, the signal processing device is configured to render processing such that a combination of at least the delay, the level and the phase of each of the signals to be outputted to the respective speakers has a specified relation with respect to another of the signals, so as to form the sound image outside a region surrounded by the at least three speakers disposed within the planar region of the casing, without depending on listening positions.

The described embodiments cause the listeners to audibly perceive, without regard to their listening positions, that the sound image is formed outside the region surrounded by the at least three speakers when the signals processed by the signal processing device are outputted from the respective corresponding speakers, such that the entire musical instrument can be formed in a compact size, and large (wide) planar sound images similar to those of a large-size natural musical instrument such as an acoustic grand piano can be formed, exceeding the arrangement of the speakers, even when there are restrictions on the arrangement of the speakers (in particular, the arrangement of the second speaker disposed on the back side as viewed from the performer). Further, sound images that are not dependent on the positions of listeners can be formed such that, even when the performer who performs by key depression on the keyboard and audiences who hear the performance sounds are located at different listening positions, both of them are made to consistently feel sound images similar in size to those of a grand piano.

In further embodiments, the signal processing device may include a first signal processing device that processes at least one of left channel signals and right channel signals composing stereophonic tone signals, such that a signal to be outputted to a reference one of the speakers and a signal to be outputted to another speaker different from the reference speaker among the at least three speakers disposed in the planar region of the casing have a relation in which the signals are mutually in opposite phases, one of the signals is delayed behind the other, and the delayed signal has a level lower than the level of the other signal. When each of the signals processed by the first signal processing device is outputted from each of the corresponding respective speakers, a sound image perceived by the listeners can be localized outside these two speakers without depending on their listening positions. Therefore, the entire musical instrument can be made in a compact size, and a large planar sound image similar to that of a large-size natural musical instrument such as an acoustic grand piano can be formed without depending on the listeners' positions. Therefore, even when the performer and the audiences are located at different listening positions, as in the case of a grand piano, both of them are made to consistently perceive sound images similar in size to those of the grand piano.

In a further embodiment, the first signal processing device processes signals to be outputted from the first speaker disposed on the front side as viewed from the performer, and signals to be outputted from the second speaker disposed on the back side as viewed from the performer, such that it is possible to create sound images expanding in a direction toward the back side for the performer and expanding in a direction toward the right or the left for the audience listening at a position angled generally at 90 degrees with respect to the performer's orientation to the casing, and sound images expanding in a direction toward the front side for the performer and expanding in a direction toward the left or the right for the audience listening at a position angled generally at 90 degrees with respect to the performer's orientation to the casing. Therefore, the electronic keyboard musical instrument can achieve an effect in which, planar sound images similar in size to those of a natural musical instrument (for example, a grand piano) can be perceived by the performer and the audiences whose listening positions are different.

In a further embodiment, the first signal processing device processes left channel signals such that the phase of the signal to be outputted to the first speaker and the phase of the signal to be outputted to the second speaker are mutually in opposite phases, the signal to be outputted to the first speaker is delayed behind the signal to be outputted to the second speaker, and the level of the signal to be outputted to the first speaker is below the level of the signal to be outputted to the second speaker. Therefore, a sound image based on the left channel signals is localized, for the performer, on the back of the second speaker disposed on the back side as viewed from the performer, while the sound image is localized on the right side, for the audience listening at a position on the right side of the performer and angled generally at 90 degrees with respect to the performer's orientation to the casing. It is noted that, for example, the lower the note of a key depressed, the further toward the back side a sound generated by the soundboard of the grand piano would be heard by the performer, and the further toward the right the sound would be heard by the audience listening at a position on the right side of the performer and angled generally at 90 degrees with respect to the performer's orientation to the casing. Therefore, by processing the left channel signal corresponding to a sound of the soundboard (the signal on the lower note side) by the first signal processing device, it is possible to create a large planar sound image similar to that of a sound of the soundboard of a grand piano, which expands toward the back side for the performer, and expands toward the right for the audience listening at a position on the right side of the performer and angled generally at 90 degrees with respect to the performer's orientation to the casing.

In a further embodiment, the first signal processing device processes right channel signals, such that the phase of the signal to be outputted to the first speaker and the phase of the signal to be outputted to the second speaker are mutually in opposite phases, the signal to be outputted to the second speaker is delayed behind the signal to be outputted to the first speaker, and the level of the signal to be outputted to the second speaker is below the level of the signal to be outputted to the first speaker. Therefore, a sound image based on the right channel signals is localized, for the performed, on the front of the first speaker disposed on the front side as viewed from the performer, while the sound image is localized on the left for the audience listening at a position on the right side of the performer and angled generally at 90 degrees with respect to the performer's orientation to the casing. The higher the note of a key depressed, the further toward the front side a sound generated by a string of the grand piano is heard by the performer, and the further toward the left the sound is heard by the audience listening at a position on the right side of the performer and angled generally at 90 degrees with respect to the performer's orientation to the casing. Therefore, by processing the right channel signals corresponding to sounds of such strings (the signals on the higher note side) by the first signal processing device, it is possible to create large planar sound images similar to those of sounds of the strings of a grand piano, which expand toward the front side for the performer, and expand toward the left for the audience listening at a position on the right side of the performer and angled generally at 90 degrees with respect to the performer's orientation to the casing.

In a further embodiment, the first signal processing device processes left channel signals of tone signals that are to be localized on the back most side as viewed from the performer among a plurality of predetermined localizations. Therefore, sound images of sounds that appear to emanate from the back side for the performer, like sounds of the soundboard of a grand piano, can be simulated.

In a further embodiment, the first signal processes right channel signals of tone signals that are to be localized at the front most side as viewed from the performer among a plurality of predetermined localizations, and the first speaker located on the right side as viewed from the performer is set as a target first speaker. Therefore, without depending on listening positions, sound images with a highest note located on the right end side as viewed from the performer and on the front side near the performer (on the side near the keyboard), like sounds of the strings of a grand piano, can be simulated.

In a further embodiment, the signal processing device may be configured to further include a second signal processing device and a third signal processing device. Here, the second signal processing device processes left channel signals of tone signals to be localized on the front side as viewed from the performer, such that the phase of the signal to be inputted to the first speaker disposed on the leftmost side as viewed from the performer and the phase of the signal to be outputted to the second speaker are mutually in opposite phases, and the signal to be outputted to the first speaker disposed on the leftmost side and the signal to be outputted to the second speaker are not delayed from one another. Therefore, a sound image based on the left channel signals of tone signals to be localized on the front side as viewed from the performer can be formed as a sound image that expands between the first speaker disposed on the leftmost side and the second speaker disposed on the back side. The lower the note, the further back from the performer the sounds of the strings of a grand piano appear to expand. Accordingly, sound images simulating such characteristics can be created.

Further, the third signal processing device processes left channel signals of tone signals to be localized on the front side as viewed from the performer (signals to be outputted to the first speaker disposed on the right side side), such that the signal to be outputted to the first speaker disposed on the right side as viewed from the performer becomes a cross-talk canceling signal to the signal to be outputted to the first speaker disposed on the leftmost side which is processed by the second signal processing device, whereby a sound image formed by the second signal processing device (i.e., a sound image expanding between the first speaker disposed on the leftmost side and the second speaker disposed on the back side) can be formed on the left side of the first speaker disposed on the left most side. Therefore, although the first speakers have restrictions on their arrangement positions, the above-described characteristics of a grand piano can be simulated.

In a further embodiment, the first signal processing device sets the phase of the signal to be outputted to the first speaker as a reference and non-inverted, such that sounds to be heard by the performer and the audiences can be formed into natural sounds without causing a feeling of wrongness.

Preferred embodiments are described below with reference to the accompanying drawings. FIG. 1 is a schematic top plan view of an electronic grand piano 1 that is an embodiment of an electronic keyboard musical instrument of the invention. It is noted that the top plan view in FIG. 1 omits illustration of a portion of the components, such as, the lid.

In the description in the present specification, the directions described herein are the directions defined with a performer P who performs using a keyboard 2 as a reference, unless specially described otherwise. More specifically, the "front" indicates the side where the keyboard 2 is disposed (or the side where the performer P is located), the "back" indicates a direction away from the keyboard 2 as viewed from the performer P, the "right" indicates a rightward direction as viewed from the performer P, and the "left" indicates a leftward direction as viewed from the performer P. In this connection, an arrow F, an arrow B, an arrow R and an arrow L shown in FIG. 1 and in FIGS. 5, 7 and 9 to be described below also indicate the directions shown by the respective arrows defined with the performer P as a reference, and respectively point toward the "frontward" direction, the "backward" direction, the "rightward" direction and the "leftward" direction defined with the performer P as a reference.

The electronic grand piano 1 is an electronic piano (an electronic musical instrument in the shape of a piano) that imitates a grand piano, and includes a keyboard 2 composed of a plurality of keys (for example, 88 keys) for the performer to perform, a casing 3 that retains the keyboard 2, a baffle board 4 in a plane shape provided on the top surface of the casing 3, and three speakers $SP_{FL}$, $SP_{FR}$ and $SP_B$ facing upward and attached respectively at three opening sections provided in the baffle board 4.

The casing 3 is composed mainly with a bottom plate (not shown) and a side plate 3*a* surrounding the periphery of the bottom plate, and has a shape that extends from the side of the keyboard 2 in a depth direction toward the back (in a direction indicated by the arrow B). The length of the casing in the front-to-back direction is shorter than the length of a casing of a grand piano in the front-to-back direction. Therefore, the electronic grand piano 1 is more compact than the grand piano, and thus can achieve space-saving in terms of the installation space.

The speakers $SP_{FL}$ and $SP_{FR}$ are full-range speakers disposed on the front side of the casing 3 (on the baffle board 4), and define a speaker on the left and a speaker on the right, respectively. These speakers $SP_{FL}$ and $SP_{FR}$ are arranged generally in parallel with the keyboard 2. On the other hand, the speaker $SP_B$ is a full-range speaker disposed on the back side of the casing 3.

When the performer P depresses keys, the electronic grand piano 1 outputs tones corresponding to the respective keys depressed through the speakers $SP_{FL}$, $SP_{FR}$ and $SP_B$. Although details will be discussed below, stereophonic tone signals sampled for the keys are divided into tone signals of sounds to be localized on the front side (first localized sounds) and tone signals of sounds to be localized on the back side (second localized sounds) according to element sounds such as sounds of the strings, thump sounds (striking sounds generated when the hammers strike), sounds of the soundboard, sounds of the resonance strings and the like. The electronic grand piano 1 in accordance with the present embodiment is configured to render processing, such as, delaying, sound volume adjusting (level adjusting) and phase adjusting for the tone signal of each of the localized signals according to sound-output destinations (the speakers $SP_{FL}$, $SP_{FR}$ or $SP_B$). According to the structure described above, the electronic grand piano 1 can form a planar sound image for each of the localized images without giving a feeling of wrongness to the performer P who hears a performance sound on the front side (on the side of the keyboard 2), and the audience A who hears the performance sound at a position angled generally at 90 degrees with respect to the orientation of the performer P relative to the casing 3. Accordingly, although being shorter in length in the front-to-back direction than that of a grand piano, the electronic grand piano 1 enables the performer P and the audience A to feel a sound image similar in size to that of the grand piano.

Figure 2:
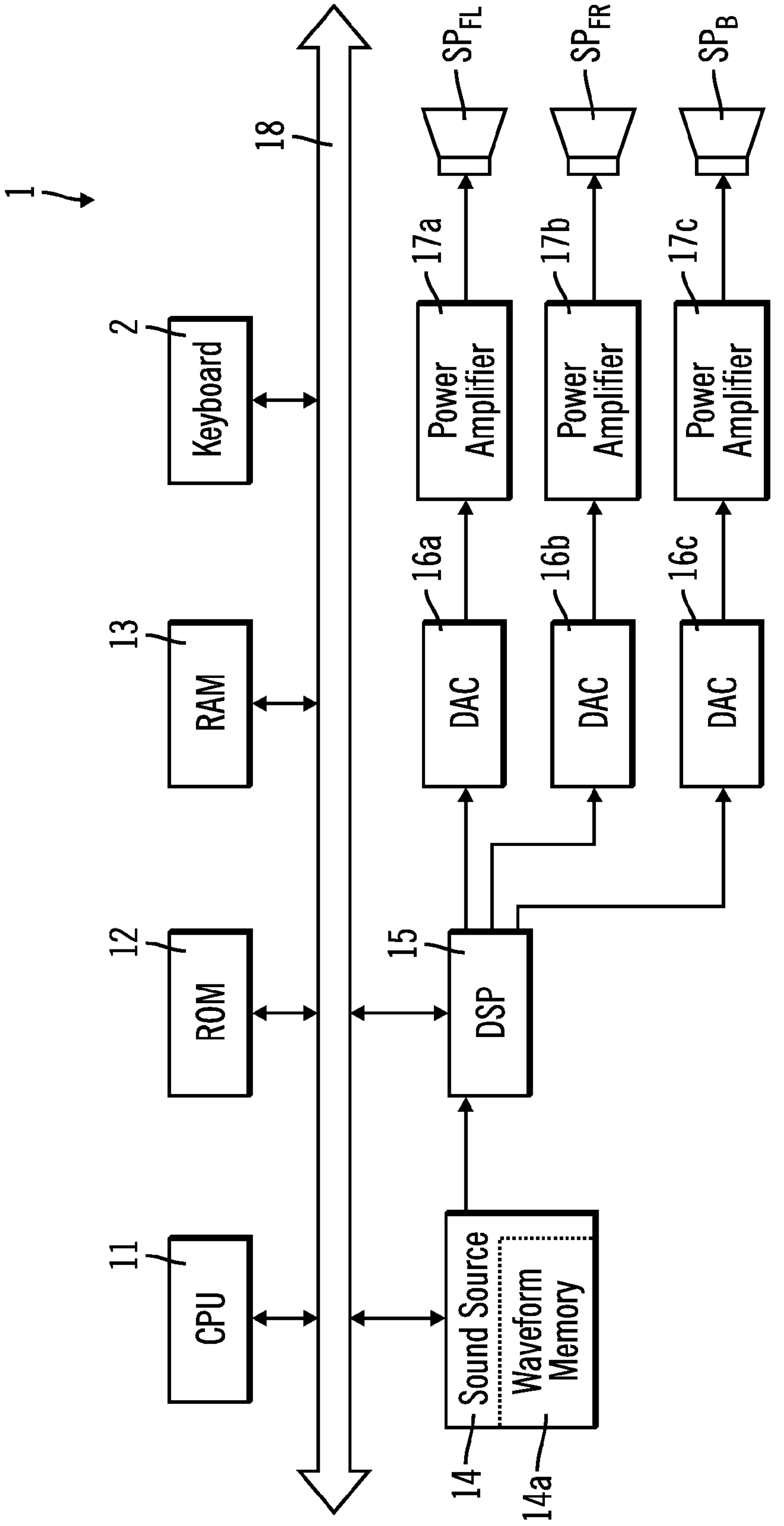
FIG. 2 is a block diagram showing an electrical composition of an electronic grand piano.

FIG. 2 is a block diagram of an electrical composition of the electronic grand piano 1. As shown in FIG. 2, the electronic grand piano 1 includes a CPU 11, a ROM 12, a RAM 13, a sound source 14 and a digital signal processor (DSP) 15, and the aforementioned components 11-15 and the keyboard 2 are mutually connected through a bus line 18. The DSP 15 connects to digital-to-analog converters (DACs) 16*a*-16*c*. The DACs 16*a*-16*c* are connected to power amplifiers 17*a*-17*c*, respectively. The power amplifiers 17*a*-17*c* are connected to the speaker $SP_{FL}$ on the front left side, the speaker $SP_{FR}$ on the front right side, and the speaker $SP_B$ on the back side, respectively.

The CPU 11 is a central control unit that controls each of the components of the electronic musical instrument 1 according to fixed value data and control programs stored in the ROM 12 and the RAM 13. The ROM 12 is a non-rewritable memory, and stores a control program (not shown) to be executed by the CPU 11 and the DSP 14, and fixed value data (not shown) to be referred to by the CPU 11 when the control program is executed. The RAM 13 is a rewritable memory, and has a work area (not shown) for temporarily storing various data for the CPU 11 to execute the control program.

The sound source 14 is configured as a sampling sound source with a built-in waveform memory 14*a*. The waveform memory 14*a* stores sound source waveforms. In one embodiment, stereophonic waveform data sampled by a one-point recording for each of the keys composing the keyboard 2 are separated for each component sounds (for example, sounds of the strings, thumping sounds, sounds of the soundboard, sounds of the resonance strings and the like), and the separated waveform data of each of the element sounds (stereophonic waveform data) are stored in the waveform memory 14*a*. The sound source 14 reads out stereophonic waveform data from the waveform memory 14*a* according to musical tone information supplied from the CPU 11 generated based on key depression on the keyboard 2, and generates, based on the readout waveform data, stereophonic digital tone signals, in other words, digital tone signals composed of L-channel signals (left-channel signals) and R-channel signals (right-channel signals) with tone pitches and tone colors corresponding to the musical tone information. As described above, the waveform memory 14*a* stores stereophonic waveform data for each of the element sounds. Therefore, the stereophonic digital tone signal to be generated by the sound source 14 is generated for each of the element sounds.

The DSP 15 is an operation device for processing stereophonic digital tone signals generated by the sound source 14 based on key depression on the keyboard 2. Although details will be discussed later, in accordance with the present embodiment, the DSP 15 processes stereophonic digital tone signals generated by the sound source 14 such that a sound outputted from each of the speakers $SP_{FL}$, $SP_{FR}$ and $SP_B$ is formed to have a sound image that is equivalent to or enhanced (exaggerated) to a level greater than that of a grand piano for both of the performer P and the audience A.

The DACs 16*a*-16*c* convert the digital tone signals processed by the DSP 15 to analog tone signals. The power amplifiers 17*a*-17*c* amplify the analog tone signals converted by the DACs 16*a*-16*c* with predetermined gains, respectively. The speakers $SP_{FL}$, $SP_{FR}$ and $SP_B$ reproduce the analog signals amplified by the power amplifiers 17*a*-17*c* and emanate (output) sounds as musical tones, respectively.

Figure 3:
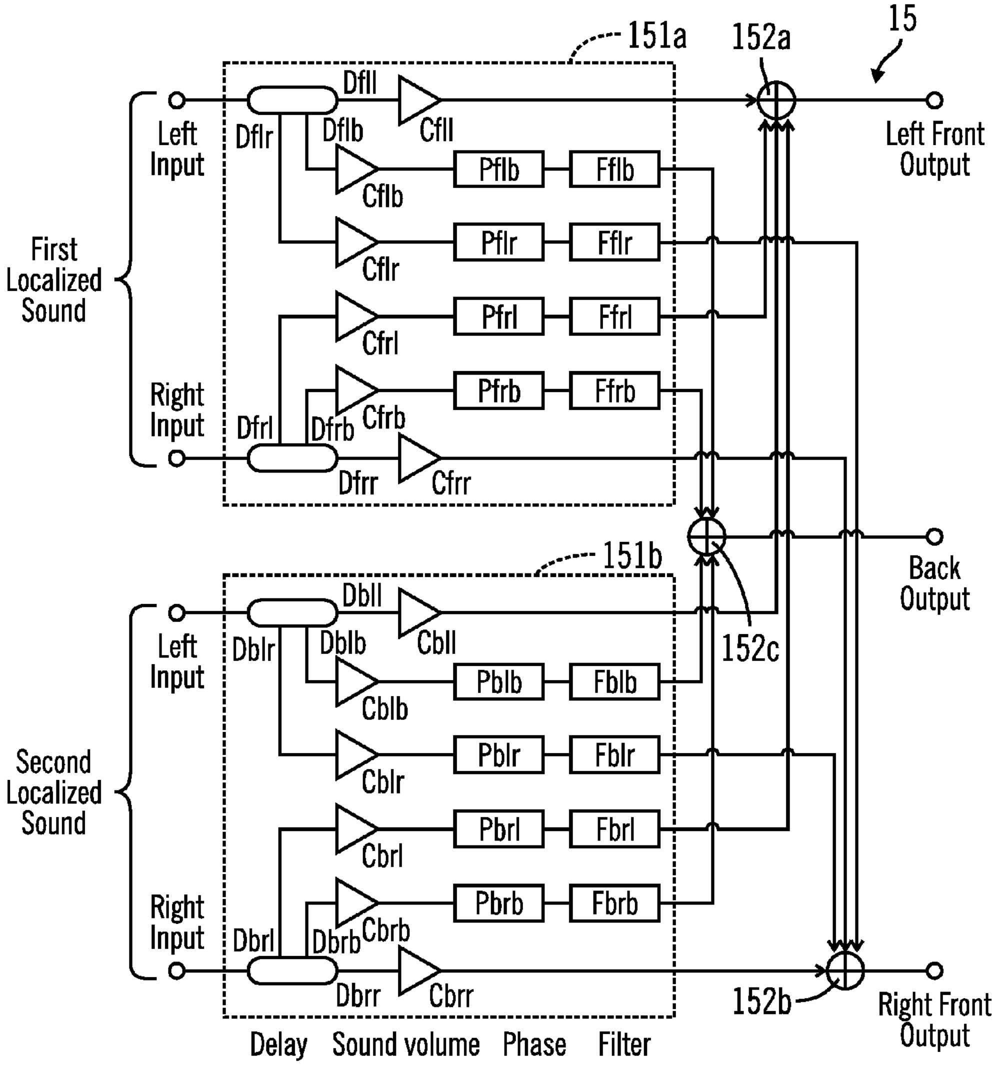
FIG. 3 is a functional block diagram showing functions of a Digital Signal Processor (DSP).

Next, referring to FIG. 3, the functions of the DSP 15 will be described. FIG. 3 is a functional block diagram of the functions of the DSP 15. It is noted that lowercase block letters "l" used throughout the specification are all expressed by cursive letters "l" in FIG. 3 and FIGS. 6 and 8 to be discussed below. As shown in FIG. 3, the functional blocks formed in the DSP 15 include a first localized sound processing section 151*a* and a second localized sound processing section 151*b*.

The first localized sound processing section 151*a* renders signal processing (delay, sound volume adjustment, phase adjustment and filter processing) on L and R channel signals of tone signals of sounds assigned as the first localized sounds, among stereophonic digital tone signals generated by the sound source 14, for each output destination speaker (the speaker $SP_{FL}$, $SP_{FR}$ or $SP_B$), respectively. It is noted that the "first localized sounds" in the embodiment refer to element sounds to be localized on the front side, such as, sounds of the strings, as viewed from the performer P.

The L channel signal, among the tone signals of the first localized sounds, is inputted in a left input of the first localized sound processing section 151*a*. The first localized sound processing section 151*a* renders signal processing on the L channel signal inputted in the left input according to a sound output destination (the speaker $SP_{FL}$, $SP_{FR}$ or $SP_B$).

More specifically, the first localized sound processing section 151*a* renders delay and sound volume adjustment processing on the L channel signal inputted in the left input at a delay section Dfll and a sound volume adjusting section Cfll, respectively, based on settings at each of the sections. Then, the signal that has been rendered with the signal processing is supplied to an adder 152*a* as a signal to be outputted from the speaker $SP_{FL}$ on the front left side.

Also, the first localized sound processing section 151*a* renders delay, volume adjustment, phase adjustment and filter processing on the L channel signal inputted in the left input at a delay section Dα, a sound volume adjustment section Cα, a phase adjustment section Pα and a filter section Fα, respectively, according to settings of the respective sections. It is noted that α represents flb or flr. Then, the signal on which each of the signal processing has been rendered is supplied to the adder 152*c* as a signal to be outputted from the speaker $SP_B$ on the back side when α is flb, and supplied to the adder 152*b* as a signal to be outputted from the speaker $SP_{FR}$ on the front right side when α is flr.

On the other hand, the R channel signal, among the tone signals of the first localized sounds, is inputted in a right input of the first localized sound processing section 151*a*. The first localized sound processing section 151*a* renders signal processing on the R channel signal inputted in the right input according to a sound output destination (the speaker $SP_{FL}$, $SP_{FR}$ or $SP_B$).

More specifically, the first localized sound processing section 151*a* renders delay and sound volume adjustment processing on the R channel signal inputted in the right input at a delay section Dfrr and a sound volume adjusting section Cfrr, respectively, based on settings at each of the sections. Then, the signal that has been rendered with the signal processing is supplied to an adder 152*b* as a signal to be outputted from the speaker $SP_{FR}$ on the front right side.

Also, the first localized sound processing section 151*a* renders delay, volume adjustment, phase adjustment and filter processing on the R channel signal inputted in the right input at a delay section Dβ, a sound volume adjustment section Cβ, a phase adjustment section Pβ and a filter section Fβ, respectively, according to settings of the respective sections. It is noted that β represents frb or frl. Then, the signal that has been rendered with each of the signal processing is supplied to the adder 152*c* as a signal to be outputted from the speaker $SP_B$ on the back side when β is frb, and supplied to the adder 152*a* as a signal to be outputted from the speaker $SP_{FL}$ on the front left side when β is frl.

The second localized sound processing section 151*b* renders signal processing (delay, sound volume adjustment, phase adjustment and filter processing) on the L and R channel signals of tone signals of sounds assigned as the second localized sounds, among the stereophonic digital tone signals generated by the sound source 14, for each output destination speaker among the speakers (the speakers $SP_{FL}$, $SP_{FR}$ and $SP_B$), respectively. It is noted that the "second localized sounds" in the embodiment refer to element sounds to be localized on the back side, such as, sounds of the soundboard, as viewed from the performer P.

The L channel signal, among the tone signals of the second localized sounds, is inputted in a left input of the second localized sound processing section 151*b*. The second localized sound processing section 151*b* renders signal processing on the L channel signal inputted in the left input according to a sound output destination (the speaker $SP_{FL}$, $SP_{FR}$ or $SP_B$).

More specifically, the second localized sound processing section 151*b* renders delay and sound volume adjustment processing on the L channel signal inputted in the left input at a delay section Dbll and a sound volume adjusting section Cbll, respectively, based on settings at the respective sections. Then, the signal that has been rendered with the signal processing is supplied to the adder 152*a* as a signal to be outputted from the speaker $SP_{FL}$ on the front left side.

Also, the second localized sound processing section 151*b* renders delay, volume adjustment, phase adjustment and filter processing on the L channel signal inputted in the left input at a delay section Dγ, a sound volume adjustment section Cγ, a phase adjustment section Pγ and a filter section Fγ, respectively, according to settings of the respective sections. It is noted that γ represents blb or blr. Then, the signal that has been rendered with each of the signal processing is supplied to the adder 152*c* as a signal to be outputted from the speaker $SP_B$ on the back side when γ is blb, and supplied to the adder 152*b* as a signal to be outputted from the speaker $SP_{FR}$ on the front right side when γ is blr.

On the other hand, the R channel signal, among the tone signals of the second localized sound, is inputted in a right input of the second localized sound processing section 151*b*. The second localized sound processing section 151*b* renders signal processing on the R channel signal inputted in the right input according to a sound output destination (the speaker $SP_{FL}$, $SP_{FR}$ or $SP_B$).

More specifically, the second localized sound processing section 151*b* renders delay and sound volume adjustment processing on the R channel signal inputted in the right input at a delay section Dbrr and a sound volume adjusting section Cbrr, respectively, based on settings at the respective sections. Then, the signal that has been rendered with the signal processing is supplied to the adder 152*b* as a signal to be outputted from the speaker $SP_{FR}$ on the front right side.

Also, the second localized sound processing section 151*b* renders delay, volume adjustment, phase adjustment and filter processing on the R channel signal inputted in the right input at a delay section Dδ, a sound volume adjustment section Cδ, a phase adjustment section Pδ and a filter section Fδ, respectively, according to settings of the respective sections. It is noted that δ represents brb or brl. Then, the signal that has been rendered with each of the signal processing is supplied to the adder 152*c* as a signal to be outputted from the speaker $SP_B$ on the back side when δ is brb, and supplied to the adder 152*a* as a signal to be outputted from the speaker $SP_{FL}$ on the front left side when δ is brl.

As described above, the signal that has passed through the sound volume adjusting section Cfll of the first localized sound processing section 151*a* (the signal based on the L channel signal of the first localized sound), the signal that has passed through the filter section Ffrl of the first localized sound processing section 151*a* (the signal based on the R channel signal of the first localized sound), the signal that has passed through the sound volume adjusting section Cbll of the second localized sound processing section 151*b* (the signal based on the L channel signal of the second localized sound), and the signal that has passed through the filter section Fbrl of the second localized sound processing section 151*b* (the signal based on the R channel signal of the second localized sound) are inputted in the adder 152*a*. These four signals are mixed by the adder 152*a*, outputted from a left front output, passed through the DAC 16*a* and the power amplifier 17*a*, and outputted as a sound from the speaker $SP_{FL}$.

Also, the signal that has passed through the filter section Fflr of the first localized sound processing section 151*a*, the signal that has passed through the sound volume adjustment section Cfrr of the first localized sound processing section 151*a*, the signal that has passed through the filter section Fblr of the second localized sound processing section 151*b*, and the signal that has passed through the sound volume adjustment section Cbrr of the second localized sound processing section 151*b* are inputted in the adder 152*b*. These four signals are mixed by the adder 152*b*, outputted from a right front output, passed through the DAC 16*b* and the power amplifier 17*b*, and outputted as a sound from the speaker $SP_{FR}$.

Further, the signal that has passed through the filter section Fflb of the first localized sound processing section 151*a*, the signal that has passed through the filter section Ffrb of the first localized sound processing section 151*a*, the signal that has passed through the filter section Fblb of the second localized sound processing section 151*b*, and the signal that has passed through the filter section Fbrb of the second localized sound processing section 151*b* are inputted in the adder 152*c*. These four signals are mixed by the adder 152*c*, outputted from a back output, passed through the DAC 16*c* and the power amplifier 17*c*, and outputted as a sound from the speaker $SP_B$.

As the sounds are outputted from the respective speakers $SP_{FL}$, $SP_{FR}$ and $SP_B$, a sound image according to the first localized sound is formed from the sounds based on the signals processed by the first localized sound processing section 151*a*, and a sound image according to the second localized sound is formed from the sounds based on the signals processed by the second localized sound processing section 151*b*.

Although details will be discussed later, the electronic grand piano 1 in accordance with the present embodiment can localize sound images of localized sounds independently from one another by the signal processing rendered by each of the localized sound processing sections 151*a* and 151*b*, such that a wider (larger) sound image than the arrangement of the speakers $SP_{FL}$, $SP_{FR}$ and $SP_B$ can be formed without depending on listening positions. For example, a sound image of the second localized sound (a sound to be localized on the back side as viewed from the performer P) is widely formed in a direction toward the back side of the casing (in the direction toward to the back side as viewed from the performer P, and the left-to-right direction as viewed from the audience A) without any inconsistency to both of the performer P and the audience A. In this manner, the electronic grand piano 1 can form a sound image wider than the arranged positions of the speakers $SP_{FL}$, $SP_{FR}$ and $SP_B$ without depending on listening positions, thereby enabling both of the performer P and the audience A to feel the sound image similar in size to that generated by a grand piano.

Figure 4:
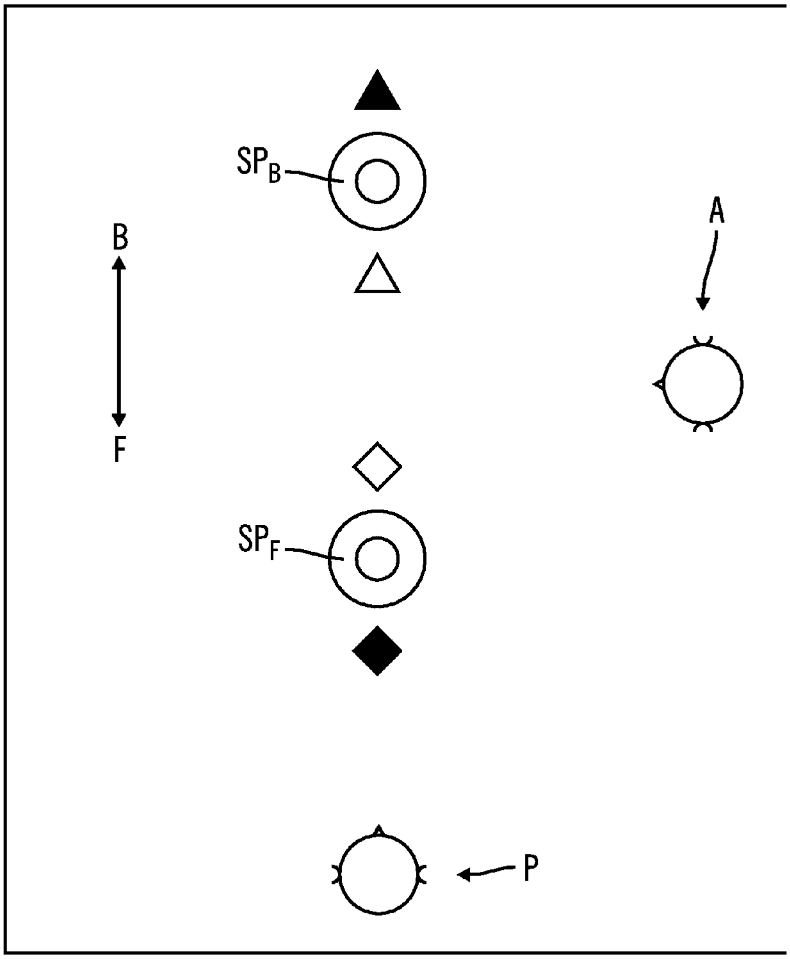
FIG. 4 is an explanatory view for explaining the relation between sets of the delay time, the sound volume and the phase and positions of sound images to be localized.

Before describing what kind of signal processing are rendered by each of the localized sound processing sections 151*a* and 151*b* for forming a sound field (the largeness of a sound image) similar to that of a grand piano without depending on the positions of listeners (for example, the performer P and the audience A) who listen to sounds generated by the electronic grand piano 1, relations between the delay time, the sound volume and the phase, and the position where a sound image is localized will be discussed with reference to FIG. 4 based on the applicant's knowledge obtained through experiments.

FIG. 4 is an explanatory diagram for explaining the relation between the delay time, the sound volume and the phase and positions where sound images are localized. A front speaker $SP_F$ and a back speaker $SP_B$ are disposed on the front side (on the side of an arrow F) and on the back side (on the side of an arrow B) as viewed from the performer P, and how sound images to be perceived by the performed P would change were examined when combinations of settings of the delay time, the sound volume and the phase of each of the signals to be supplied to each of the speakers SPF and SPB were changed. On the other hand, the audience A was located at a position angled generally at 90 degrees with respect to the orientation of the performer P to an arrangement direction between the front speaker $SP_F$ and the back speaker $SP_B$, and how sound images to be felt by the audience A would change were also examined.

First, signals to be supplied to the front speaker $SP_F$ and the back speaker $SP_B$ were set to the same phase, they were set to the same delay time, and their sound volumes were adjusted. In this case, in Setting 1, when the sound volume of the front speaker $SP_F$ was made smaller than the sound volume of the back speaker $SP_B$, a sound image felt by the performer P and a sound image felt by the audience A were both localized at a position closer to the back speaker $SP_B$ (Position Δ) between the speakers $SP_F$ and $SP_B$. On the other hand, in Setting 2, when the sound volume of the front speaker $SP_F$ was made greater than the sound volume of the back speaker $SP_B$, a sound image felt by the performer P and a sound image felt by the audience A were both localized at a position closer to the front speaker $SP_F$ (Position ◇) between the speakers $SP_F$ and $SP_B$.

Next, signals to be supplied to the front speaker $SP_F$ and the back speaker $SP_B$ were set to the same phase, they were set to the same sound volume, and their delay times were adjusted. In this case, in Setting 3, when the signal on the side of the front speaker $SP_F$ was delayed, a sound image felt by the performer P and a sound image felt by the audience A were both localized at a position closer to the back speaker $SP_B$ (Position Δ). On the other hand, in Setting 4, when the signal on the side of the back speaker $SP_B$ was delayed, a sound image felt by the performer P and a sound image felt by the audience A were both localized at a position closer to the front speaker $SP_F$ (Position ◇).

When the signals to be supplied to the front speaker $SP_F$ and the back speaker $SP_B$ were set to the same phase, the sound image localization by Setting 1 and Setting 2 corresponds to sound volume panning in the audible reception (hearing) at the position of the audience A, and the sound image localization by Setting 3 and Setting 4 corresponds to delay panning by the Haas effect. In the case of audible reception at the position of the performer P, effects similar to those obtained in the audible reception at the position of the audience A can be obtained. A sound image tends to be felt bigger in the delay panning rather than in the sound volume panning. Therefore, in both of the cases of audible reception at the position of the audience A and audible reception at the position of the performer P, the size of a sound image can be changed by changing the relation between the sound volume and the delay time.

Further, signals to be supplied to the front speaker $SP_F$ and the back speaker $SP_B$ were mutually set in opposite phases, they were set to the same sound volume, and their delay times were adjusted. In this case, in Setting 5, when the signals to be supplied to the speakers $SP_F$ and $SP_B$ were set to the same delay time, a sound image felt by the performer P and a sound image felt by the audience A both became larger between the speakers $SP_F$ and $SP_B$. On the other hand, in Setting 6, when the signal is delayed on the side of the front speaker $SP_F$, and the delay time was set to an appropriate value, a sound image felt by the performer P and a sound image felt by the audience A were both localized at a position on the back of the back speaker $SP_B$ (on the side of the arrow B) (Position ▲). In this Setting 6, the smaller the sound volume of the front speaker $SP_F$, the closer to the back speaker $SP_B$ the position of a sound image felt by the performer P and the audience A shifted. Also, in Setting 7, when the signal is delayed on the side of the back speaker $SP_B$, and the delay time was set to an appropriate value, a sound image felt by the performer P and a sound image felt by the audience A were both localized at a position on the front of the front speaker $SP_F$ (on the side of the arrow F) (Position ◆). In this Setting 7, the smaller the sound volume of the back speaker $SP_B$, the closer to the front speaker $SP_F$ the position of a sound image felt by the performer P and the audience A shifted.

When the signals to be supplied to the front speaker $SP_F$ and the back speaker $SP_B$ are mutually set in opposite phases, and one of the signals is delayed behind the other signal, cross-talk cancellation works in audible perception at the position of the audience A. Therefore, in Setting 6 and Setting 7, a sound image of a sound audibly perceived at the position of the audience A can be localized at a position outside both of the speakers $SP_F$ and $SP_B$. It is noted that it is not necessary to localize a sound image just next to the ears of the audience A, and therefore the level (sound volume) of a cross-talk canceling signal can be low.

In general, with respect to a direct sound, there is a tendency in which a sound with greater reverberation is felt to come from afar, and a sound with smaller reverberation is felt to come from nearer. Therefore, when a sound is heard at the position of the performer P, when the signals to be supplied to the front speaker $SP_F$ and the back speaker $SP_B$ are mutually set in opposite phases, and the signal to be supplied to the front speaker $SP_F$ is delayed (i.e., as in Setting 6), then the direct sound and the primary reflection from a wall (a back surface) on the back of the performer P in a room are mutually cancelled out, and reverberations by the left and right walls and the back side wall relatively become greater, such that the sound image is audibly perceived as coming from afar. When the delay time of the signal to be supplied to the front speaker $SP_F$ is set to a delay time corresponding to the distance between the speakers $SP_F$ and $SP_B$, the direct sound would be cancelled out most, such that the sound image, when heard at the position of the performer P, can be localized at the remotest position.

Further, when the signals to be supplied to the front speaker $SP_F$ and the back speaker $SP_B$ are mutually set in opposite phases, and the signal to be supplied to the back speaker $SP_B$ is delayed behind the signal to be supplied to the front speaker $SP_F$ by a delay time with which reflected sounds of the room would be cancelled out (i.e., as in Setting 7), the sound to be heard by the performer P would be felt drier as the direct sound becomes relatively greater, such that the sound image is felt as being shifted closer. Reflected sounds may vary depending on each individual room. However, by setting the delay time of the signal to be supplied to the back speaker $SP_B$ by a delay time corresponding to the separation distance between the speakers $SP_F$ and $SP_B$, the primary reflection at the wall on the back side can be cancelled out without depending on the room.

Table 1 below summarizes the results described above as to the relations between each of Settings 1-7 according to the settings of the delay time, the sound volume and the phase, and the positions of sound images localized.

TABLE 1

| Setting | Phase | Delay Time | Sound Volume | Position of a localized sound image |
|---|---|---|---|---|
| Setting 1 | Same Phase | Same delay time | Front speaker $SP_F$ < Back speaker $SP_B$ | Δ: Closer to Back speaker $SP_B$ |
| Setting 2 | | | Front speaker $SP_F$ > Back speaker $SP_B$ | ◇: Closer to Front speaker $SP_F$ |
| Setting 3 | | Delayed on the side of Front speaker $SP_F$ | Same sound volume | Δ: Closer to Back speaker $SP_B$ |
| Setting 4 | | Delayed on the side of Back speaker $SP_B$ | | ◇: Closer to Front speaker $SP_F$ |
| Setting 5 | Opposite Phase | Same delay time | Same sound volume | The sound image become larger between the two speakers $SP_F$ and $SP_B$ |
| Setting 6 | | Delayed on the side of Front speaker $SP_F$ (with an appropriate value) | Same sound volume | ▲ Further back than Back speaker $SP_B$ |
| | | | The smaller the sound volume of Front speaker $SP_F$, the closer the sound image approaches Back speaker $SP_B$ | |
| Setting 7 | | Delayed on the side of Back speaker $SP_B$ (with an appropriate value) | Same sound volume | ◆ Further front than Front speaker $SP_F$ |
| | | | The smaller the sound volume of Back speaker $SP_B$, the closer the sound image approaches Front speaker $SP_F$ | |

Therefore, by adjusting the phase, the delay and the sound volume (level) of signals to be supplied to the front speaker $SP_F$ and the back speaker $SP_B$, sound images can be created not only between the front speaker $SP_F$ and the back speaker $SP_B$, but also outside of these speakers. When an inputted signal is a stereophonic tone signal, the stereophonic tone signal is localized between a localization position based on the left channel signal and a localization position based on the right channel signal, such that a planar sound image can be formed. Accordingly, by providing stereophonic signals as input signals, and by adjusting the phase, the delay and the sound volume of each of the channel signals, sound images exceeding the region surrounded by speakers (the speakers $SP_{FL}$, $SP_{FR}$ and $SP_B$) placed on a casing (the casing 3) and, even sound images larger than the casing can be formed.

Next, referring to FIG. 5, more concrete signal processing rendered by the above-described first localized sound processing section 151*a* and second localized sound processing section 151*b* on tone signals of first localized sounds and tone signals of second localized sounds, respectively, will be described, for creating a sound field similar to that of a grand piano for both of the performer P of the electronic grand piano 1 and the audience A.

Figure 5:
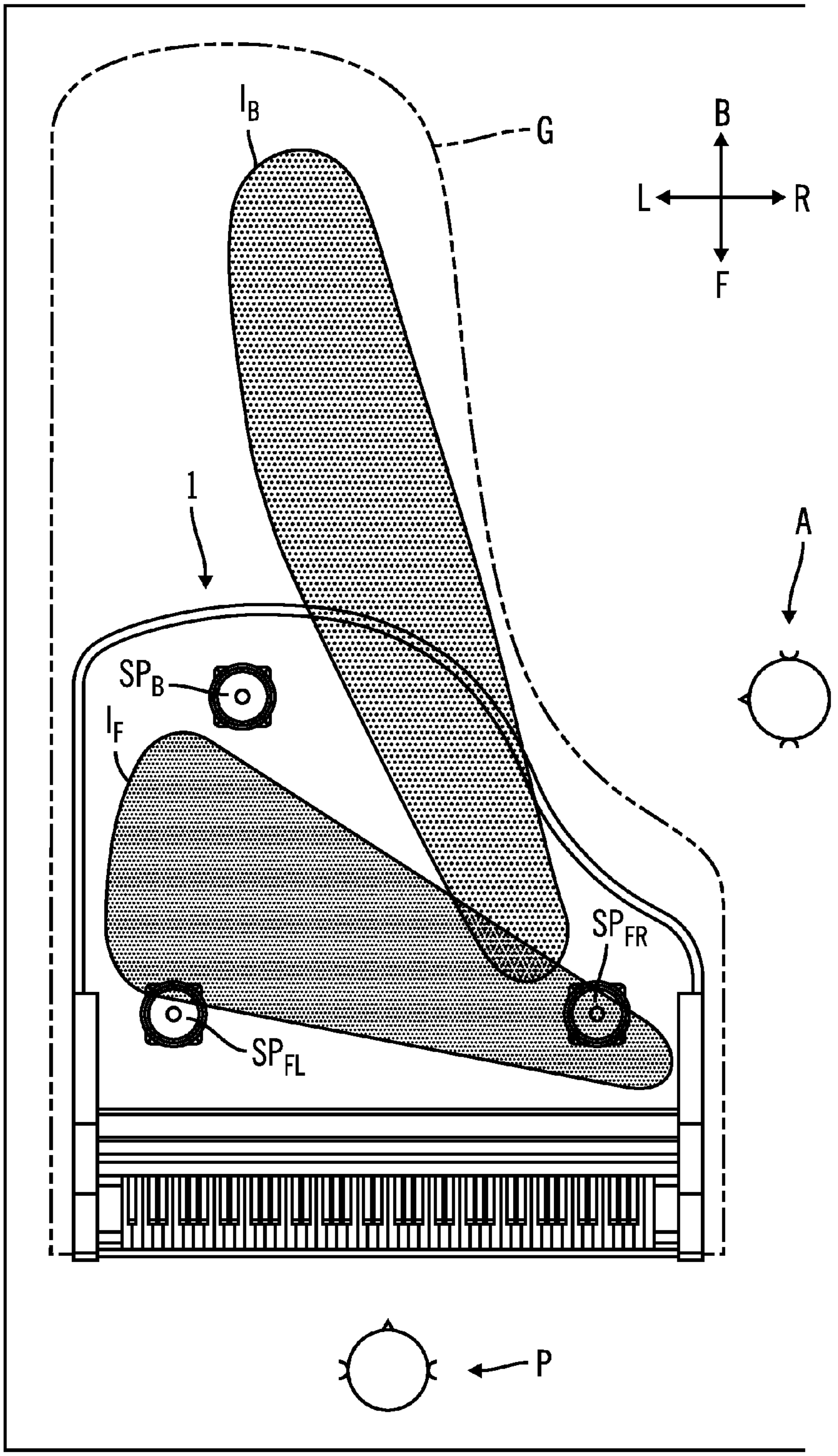
FIG. 5 is a schematic diagram showing sound images of localized sounds formed by the electronic grand piano.

FIG. 5 is a schematic diagram showing sound images of localized sounds created by the electronic grand piano 1. In FIG. 5, a sound image $I_F$ is a sound image of the first localized sound (a sound to be localized on the front side as viewed from the performer P), and a sound image $I_B$ is a sound image of the second localized sound (a sound to be localized on the back side as viewed from the performer P).

First, the tone signals inputted in the left input of the first localized sound processing section 151*a* (the L channel signals of the first localized sounds) are processed, based on Setting 5 described above, such that the signal to be outputted from the front left side speaker $SP_{FL}$ and the signal to be outputted from the back side speaker $SP_B$ are not mutually delayed but have mutually opposite phases. By this, a sound image expanding between the front left side speaker $SP_{FL}$ and the back side speaker $SP_B$ is formed. In this instance, by slightly lowering the sound volume of the back side speaker $SP_B$, the sound image is shifted closer to the front left side speaker $SP_{FL}$.

Further, by outputting from the front right side speaker $SP_{FR}$ a cross-talk canceling signal that is opposite in phase and delayed with respect to the signal on the front left side speaker $SP_{FL}$, the above-described sound image expanding between the front left side speaker $SP_{FL}$ and the back side speaker $SP_B$ and located slightly closer to the front left side speaker $SP_{FL}$ is positioned slightly on the left side of a line connecting between the speaker $SP_{FL}$ and the speaker $SP_B$.

In other words, by the settings listed below, based on the L channel signals of the first localized sounds, a sound image expanding between the front left side speaker $SP_{FL}$ and the back side speaker $SP_B$, slightly shifted toward the front left side speaker $SP_{FL}$, and located slightly on the left side of the line connecting between the speaker $SP_{FL}$ and the speaker $SP_B$ is formed. It is noted that the phase of the signal to be outputted from a front side speaker (e.g., the front left side speaker $SP_{FL}$) is set as a reference (in other words, non-inversion).

Settings for tone signals inputted in the left input of the first localized sound processing section 151*a:*

Settings based on Setting 5:

- Delay time by the delay section Dflb=Delay time by the delay section Dfll;
- sound volume set by the sound volume adjusting section Cflb≤Sound volume set by the sound volume adjusting section Cfll Phase inverted by the phase adjusting section Pflb (Invert); and Output of a cross-talk canceling signal:

- delay time by the delay section Dflr>Delay time by the delay section Dfll;
- a sound volume set by the sound volume adjusting section Cflr<Sound volume set by the sound volume adjusting section Cfll.
- Phase inverted by the phase adjusting section Pflr (Invert).

On the other hand, the tone signals inputted in the right input of the first localized sound processing section 151*a* (the R channel signals of the first localized sounds) are processed, based on Setting 7 described above, such that the signal to be outputted from the front right side speaker $SP_{FR}$ and the signal to be outputted from the back side speaker $SP_B$ have mutually opposite phases, and the signal to be outputted from the back side speaker $SP_B$ is delayed behind the signal to be outputted from the front right side speaker $SP_{FR}$. By this, a sound image located on a line connecting between the front right side speaker $SP_{FR}$ and the back side speaker $SP_B$ and on the front side of the speaker $SP_{FR}$ is formed. In this instance, the level (sound volume) of the signal to be outputted from the back side speaker $SP_B$ is lowered, thereby adjusting the location of the sound image to an appropriate position closer to the speaker $SP_{FR}$.

Further, by outputting from the front left side speaker $SP_{FL}$ a cross-talk canceling signal that is opposite in phase and delayed with respect to the signal on the front right side speaker $SP_{FR}$, the above-described sound image is located slightly on the right side of a line connecting between the speaker $SP_{FR}$ and the speaker $SP_B$.

In other words, by the settings listed below, based on the R channel signals of the first localized sounds, a sound image located on the line connecting between the front right side speaker $SP_{FR}$ and the back side speaker $SP_B$, slightly on the front side of and slightly on the right side of the speaker $SP_{FR}$ is formed. It is noted that the phase of the signal to be outputted from a front side speaker (e.g., the front right side speaker $SP_{FR}$) is set as a reference (in other words, non-inversion).

Settings for tone signals inputted in the right input of the first localized sound processing section 151*a:*

Settings based on Setting 7:

- Delay time by the delay section Dfrb>Delay time by the delay section Dfrr
- Sound volume set by the sound volume adjusting section Cfrb≤Sound volume set by the sound volume adjusting section Cfrr
- Phase inverted by the phase adjusting section Pfrb (Invert)

Output of a cross-talk canceling signal:

- Delay time by the delay section Dfrl>Delay time by the delay section Dfrr
- Sound volume set by the sound volume adjusting section Cfrl<Sound volume set by the sound volume adjusting section Cfrr
- Phase inverted by the phase adjusting section Pfrl (Invert)

As a result of the signal processing described above rendered by the first localized sound processing section 151*a* on the L channel signals and the R channel signals of the first localized sounds, respectively, a sound image is formed between the three speakers $SP_{FL}$, $SP_{FR}$ and $SP_B$ disposed on the electronic grand piano 1, slightly shifted toward the front side speakers ($SP_{FL}$ and $SP_{FR}$), expanding slightly on the left side of a line connecting between the speaker $SP_{FL}$ and the speaker $SP_B$, and expanding slightly on the front side of and slightly on the right side of the speaker $SP_{FR}$ (i.e., a sound image indicated by $I_F$) is formed as a sound image of the first localized sounds.

Next, the tone signals inputted in the left input of the second localized sound processing section 151*b* (the L channel signals of the second localized sounds) are processed, based on Setting 6 described above, such that the signal to be outputted from the front left side speaker $SP_{FL}$ and the signal to be outputted from the back side speaker $SP_B$ have mutually opposite phases, and the signal to be outputted from the speaker $SP_{FL}$ is delayed behind the signal to be outputted from the speaker $SP_B$. By this, a sound image positioned on a line connecting between the front left side speaker $SP_{FL}$ and the back side speaker $SP_B$, and located on the back side of the speaker $SP_B$ is formed. In this instance, by slightly lowering the level (sound volume) of the signal to be outputted from the front left side speaker $SP_{FL}$, the sound image is adjusted to an appropriate position closer to the speaker $SP_B$. It is noted that the sound volume of the front right side speaker $SP_{FR}$ is zero.

In other words, by the settings listed below, based on the L channel signals of the second localized sounds, a sound image located on the line connecting between the front left side speaker $SP_{FL}$ and the back side speaker $SP_B$, and on the back side of the speaker $SP_B$ is formed. It is noted that the phase of the signal to be outputted from the front left side speaker $SP_{FL}$ is set as a reference (in other words, non-inversion).

Settings for tone signals inputted in the left input of the second localized sound processing section 151*b:*

Settings based on Setting 6:

- Delay time by the delay section Dblb<Delay time by the delay section Dbll

Sound volume set by the sound volume adjusting section Cblb>Sound volume set by the sound volume adjusting section Cbll Phase inverted by the phase adjusting section Pblb (Invert)

Other

Sound volume set by the sound volume adjusting section Cblr=0

On the other hand, the tone signals inputted in the right input of the second localized sound processing section 151*b* (the R channel signals of the second localized sounds) are processed, based on Setting 2 described above, such that the signal to be outputted from the front right side speaker $SP_{FR}$ and the signal to be outputted from the back side speaker $SP_B$ are in the same phase, and the sound volume of the front right side speaker $SP_{FR}$ is set greater than that of the back side speaker $SP_B$. By this, a sound image located between the front right side speaker $SP_{FR}$ and the back side speaker $SP_B$, and toward the side of the speaker $SP_{FR}$ is formed. It is noted that the sound volume of the front left side speaker $SP_{FL}$ is zero.

In other words, by the settings listed below, based on the R channel signals of the second localized sounds, a sound image located between the front right side speaker $SP_{FR}$ and the back side speaker $SP_B$, and on the side of the speaker $SP_{FR}$ is formed. It is noted that the phase of the signal to be outputted from the front right side speaker $SP_{FR}$ is set as a reference (non-inversion).

Settings for tone signals inputted in the right input of the second localized sound processing section 151*b:*

Settings based on Setting 2:

Delay time by the delay section Dbrb=Delay time by the delay section Dbrr

Sound volume set by the sound volume adjusting section Cbrb<Sound volume set by the sound volume adjusting section Cbrr Phase adjusted by the phase adjusting section Pbrb (Non Invert)

Other

Sound volume set by the sound volume adjusting section Cbrl=0

As a result of the signal processing described above rendered by the second localized sound processing section 151*b* on the L channel signals and the R channel signals of the second localized sounds, respectively, a long and narrow sound image that expands from the side of the front right side speaker $SP_{FR}$ to a position on the back of the speaker $SP_B$ on a line connecting between the front left side speaker $SP_{FL}$ and the back side speaker $SP_B$ (i.e., a sound image indicated by $I_B$) is formed as a sound image of the second localized sounds.

As described above, according to the electronic grand piano 1 of the present embodiment, by the signal processing rendered by the first and second localized sound processing sections 151*a* and 151*b*, sound images (the sound image $I_F$ of the first localized sound and the sound image $I_B$ of the second localized sound) to be perceived by the performer P and the audience A can be created wider (larger) than the arrangement of the speakers $SP_{FL}$, $SP_{FR}$ and $SP_B$.

In the present embodiment, element sounds to be localized on the front side as viewed from the performer P (for example, sounds of the strings) are defined as the first localized sounds. The strings of a grand piano are arranged side by side along a direction of the keyboard 2 and, the lower the notes the longer the length thereof. Therefore, the sound image $I_F$ of the first localized sounds which expands in the direction away from the keyboard 2 (in the direction of the arrow B) in a greater degree toward the left side as viewed from the performer P (toward the back side as viewed from the audience A) presents a realistic sound image that well simulates a targeted grand piano G to both of the performer P and the audience A.

Also, with a grand piano, sounds on the higher note side sound to be emanating from locations closer to the keyboard 2 compared to sounds on the lower note side. The electronic grand piano 1 is configured to localize sounds on the higher tone side (i.e., sounds based on the R channel signals) on the front side of the position of the speaker $SP_{FR}$, such that the characteristics described above can be simulated despite restrictions on the arrangement of the speaker $SP_{FR}$.

On the other hand, in the present embodiment, element sounds to be localized on the back side as viewed from the performer P are defined as the second localized sounds. The electronic grand piano 1 is configured to create the sound image $I_B$ of the second localized sounds in a long and narrow sound image expanding from the front side toward the back side as viewed from the performer P (from the left side to the right side for the audience A), thereby presenting a realistic sound image that well simulates the targeted grand piano G to both of the performer P and the audience A.

Therefore, according to the electronic grand piano 1 of the present embodiment, although the size of the entire musical instrument is compact compared to the size of the grand piano G, it is possible to enable both of the performer P and the audience to feel a sound image similar in size to that of the targeted grand piano G, though the localization in the direction to the back may not be perfect. However, as the human auditory sense is relatively dull in the depth direction, the sound image can give an impression to both of the performer P and the audience to have the size similar to that of the targeted grand piano G. Also, as the first localized sounds and the second localized sounds are stereophonic sounds formed from L channel signals and R channel signals, they can be localized well in the left-to-right direction as heard from the position of the performer P and from the position of the audience A, and can be heard as being in sufficiently realistic sound images. Also, as the phase of the signal outputted from the front side speaker (the speaker $SP_{FL}$ or the speaker $SP_{FR}$) is used as reference, sounds that are heard by the performer P and the audience A can be formed into natural sounds without causing a feeling of wrongness.

Next, referring to FIGS. 6 and 7, a second embodiment will be described. In the first embodiment described above, three speakers $SP_{FL}$, $SP_{FR}$ and $SP_B$ are arranged on the electronic grand piano 1, and two types of localized sounds (i.e., the first and second localized sounds) outputted from each of the speakers $SP_{FL}$, $SP_{FR}$ and $SP_B$ are localized as sound images independently from one another. In contrast, in accordance with the second embodiment, the electronic grand piano 1 is provided with three speakers $SP_{FL}$, $SP_{FR}$ and $SP_B$, and three types of localized sounds are localized as sound images independently from one another. It is noted that sections of the second embodiment identical with those of the first embodiment described above will be appended with the same reference numbers, and their description will not omitted.

Figure 6:
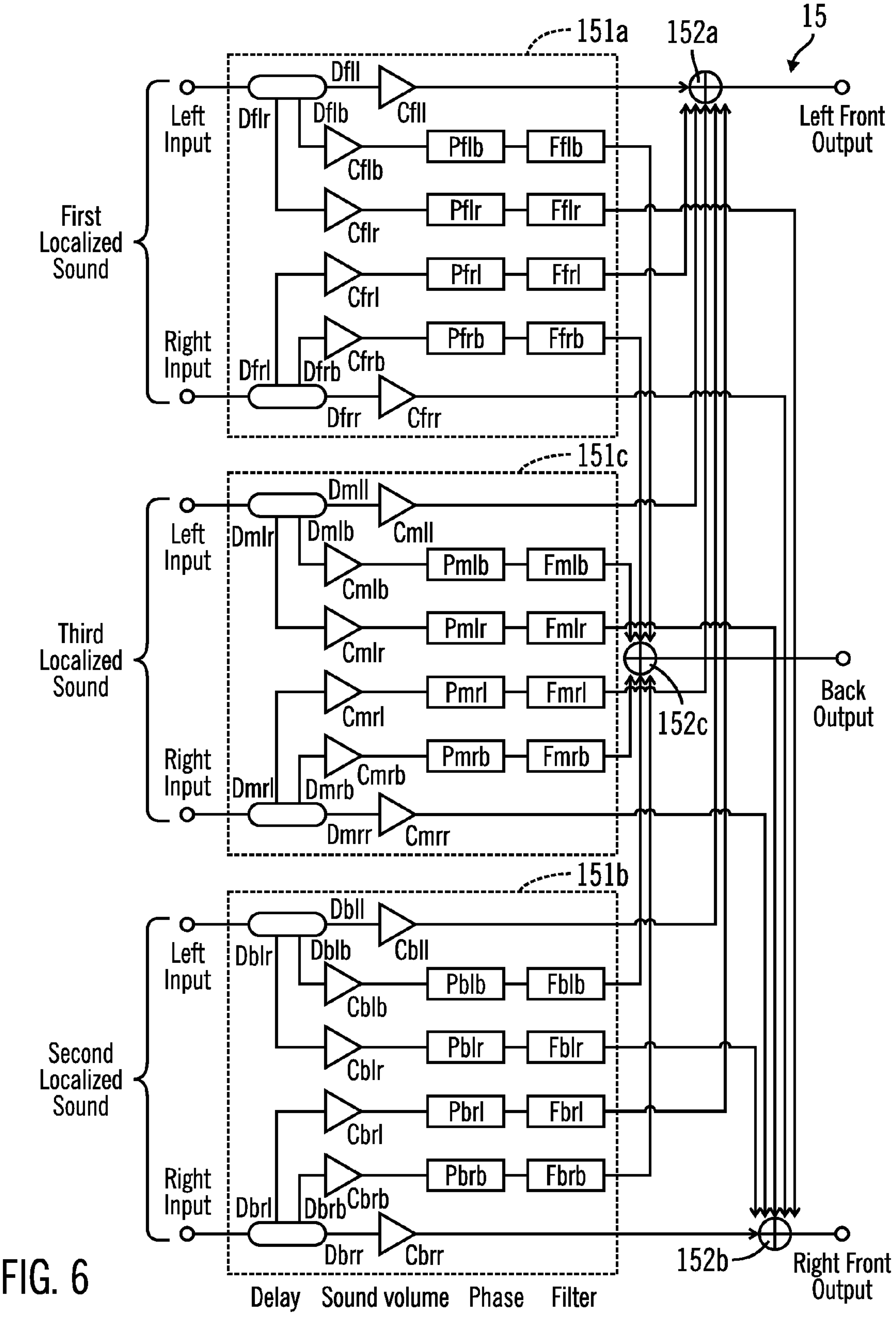
FIG. 6 is a functional block diagram showing functions of a DSP in accordance with a second embodiment.
Figure 7:
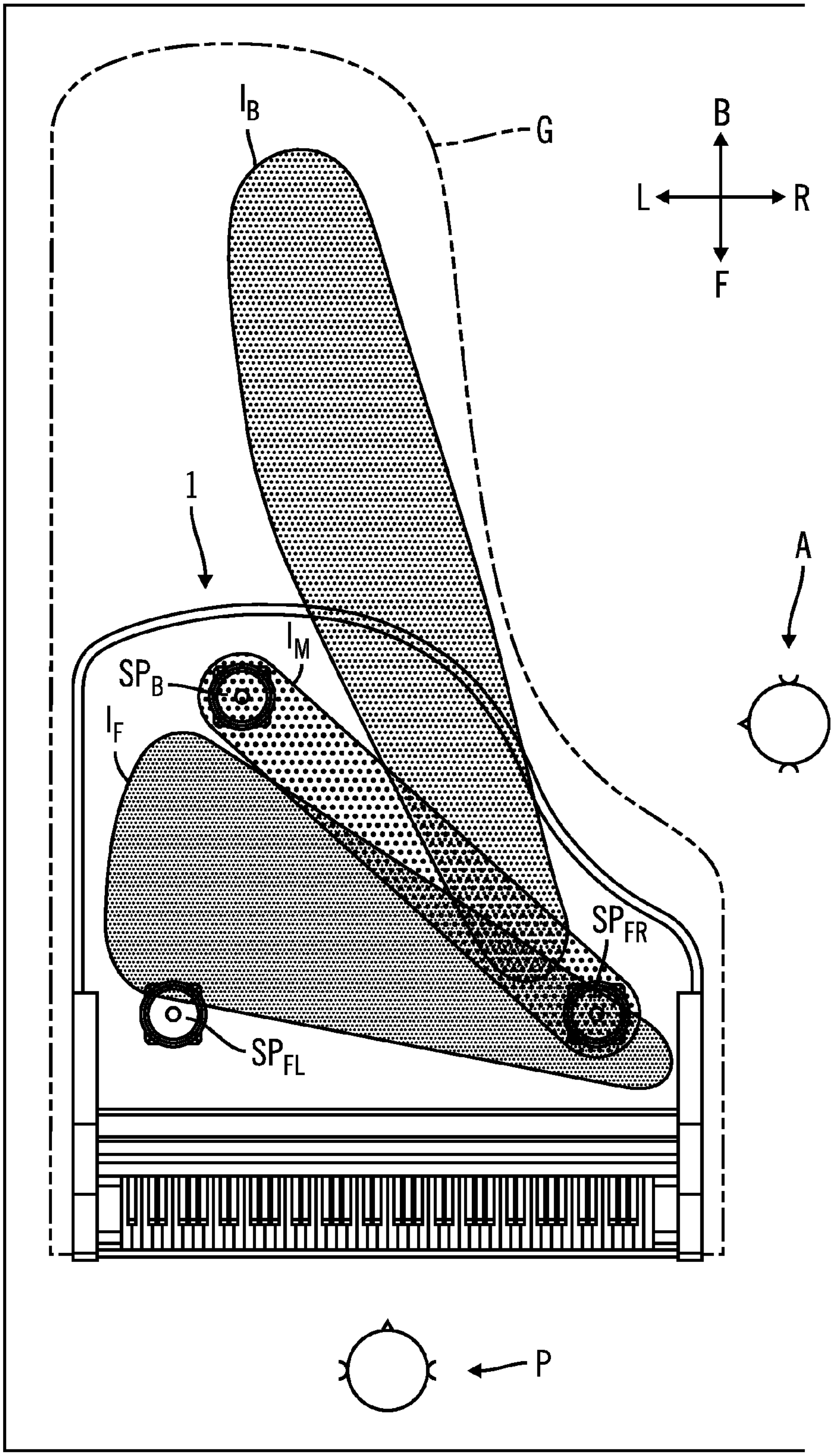
FIG. 7 is a schematic diagram showing sound images of localized sounds formed by an electronic grand piano in accordance with the second embodiment.

FIG. 6 is a functional block diagram of the functions of a DSP 15 in accordance with the second embodiment. As shown in FIG. 6, the functional blocks formed in the DSP 15 include a first localized sound processing section 151*a*, a second localized sound processing section 151*b*, and a third localized sound processing section 151*c*.

Like the first embodiment, when L channel signals and R channel signals of first localized sounds (sounds to be localized on the front side as viewed from the performer P, such as, sounds of the strings) are inputted in a left input and a right input, respectively, the first localized sound processing section 151*a* renders signal processing (delay, sound volume adjustment, phase adjustment and filter processing) on each of the channel signals according to a sound output destination (the speaker $SP_{FL}$, $SP_{FR}$ or $SP_B$). Each of the channel signals that has been rendered with the signal processing according to the respective output destination (the speaker $SP_{FL}$, $SP_{FR}$ or $SP_B$) is supplied to a corresponding one of adders 152*a*-152*c* according to the output destination.

On the other hand, like the first embodiment, when L channel signals and R channel signals of second localized sounds (sounds to be localized on the back side as viewed from the performer P, such as, sounds of the soundboard) are inputted in a left input and a right input, respectively, the second localized sound processing section 151*b* renders signal processing (delay, sound volume adjustment, phase adjustment and filter processing) on each of the channel signals according to a sound output destination (the speaker $SP_{FL}$, $SP_{FR}$ or $SP_B$). Each of the channel signals that has been rendered with the signal processing according to the respective output destination (the speaker $SP_{FL}$, $SP_{FR}$ or $SP_B$) is supplied to a corresponding one of the adders 152*a*-152*c* according to the output destination.

The third localized sound processing section 151*c* renders signal processing (delay, sound volume adjustment, phase adjustment and filter processing) on L and R channel signals of tone signals of sounds assigned as the third localized sounds, among stereophonic digital tone signals generated by the sound source 14, for each output destination speaker (the speaker $SP_{FL}$, $SP_{FR}$ or $SP_B$), respectively. It is noted that the "third localized sound" in the present embodiment refers to element sounds to be localized between the first localized sound and the second localized sound, such as, sounds of the resonance strings.

The L channel signal, among the tone signals of the third localized sounds, is inputted in a left input of the third localized sound processing section 151*c*. The third localized sound processing section 151*c* renders signal processing on the L channel signal inputted in the left input according to a sound output destination (the speaker $SP_{FL}$, $SP_{FR}$ or $SP_B$).

More specifically, the third localized sound processing section 151*c* renders delay and sound volume adjustment processing on the L channel signal inputted in the left input at a delay section Dmll and a sound volume adjusting section Cmll, respectively, based on settings at the respective sections. Then, the signal that has been rendered with the signal processing is supplied to the adder 152*a* as a signal to be outputted from the speaker $SP_{FL}$ on the front left side.

Also, the third localized sound processing section 151*c* renders delay, volume adjustment, phase adjustment and filter processing on the L channel signal inputted in the left input at a delay section D∊, a sound volume adjustment section C∊, a phase adjustment section P∊ and a filter section F∊, respectively, according to settings of the respective sections. It is noted that ∊ represents mlb or mlr. Then, the signal that has been rendered with each of the signal processing is supplied to the adder 152*c* as a signal to be outputted from the back side speaker $SP_B$ when ∊ is mlb, and supplied to the adder 152*b* as a signal to be outputted from the front right side speaker $SP_{FR}$ when ∊ is mlr.

On the other hand, the R channel signal, among the tone signals of the first localized sounds, is inputted in a right input of the third localized sound processing section 151*c*. The third localized sound processing section 151*c* renders signal processing on the R channel signal inputted in the right input according to a sound output destination (the speaker $SP_{FL}$, $SP_{FR}$ or $SP_B$).

More specifically, the third localized sound processing section 151*c* renders delay and sound volume adjustment processing on the R channel signal inputted in the right input at a delay section Dmrr and a sound volume adjusting section Cmrr, respectively, based on settings at each of the sections. Then, the signal that has been rendered with the signal processing is supplied to the adder 152*b* as a signal to be outputted from the speaker $SP_{FR}$ on the front right side.

Also, the third localized sound processing section 151*c* renders delay, volume adjustment, phase adjustment and filter processing on the R channel signal inputted in the right input at a delay section Dζ, a sound volume adjustment section Cζ, a phase adjustment section Pζ and a filter section Fζ, respectively, according to settings of the respective sections. It is noted that ζ represents mrb or mrl. Then, the signal that has been rendered with each of the signal processing is supplied to the adder 152*c* as a signal to be outputted from the speaker $SP_B$ on the back side when ζ is mrb, and supplied to the adder 152*a* as a signal to be outputted from the speaker $SP_{FL}$ on the front left side when ζ is mrl.

As described above, the signal that has passed through the sound volume adjusting section Cfll of the first localized sound processing section 151*a* (the signal based on the L channel signal of the first localized sound), the signal that has passed through the filter section Ffrl of the first localized sound processing section 151*a* (the signal based on the R channel signal of the first localized sound), the signal that has passed through the sound volume adjusting section Cbll of the second localized sound processing section 151*b* (the signal based on the L channel signal of the second localized sound), the signal that has passed through the filter section Fbrl of the second localized sound processing section 151*b* (the signal based on the R channel signal of the second localized sound), the signal that has passed through the sound volume adjusting section Cmll of the third localized sound processing section 151*c* (the signal based on the L channel signal of the third localized sound), and the signal that has passed through the filter section Fmrl of the third localized sound processing section 151*c* (the signal based on the R channel signal of the third localized sound) are inputted in the adder 152*a*. These six signals are mixed by the adder 152*a*, outputted from a left front output, passed through the DAC 16*a* and the power amplifier 17*a*, and outputted as a sound from the speaker $SP_{FL}$.

Also, the signal that has passed through the filter section Fflr of the first localized sound processing section 151*a*, the signal that has passed through the sound volume adjustment section Cfrr of the first localized sound processing section 151*a*, the signal that has passed through the filter section Fblr of the second localized sound processing section 151*b*, the signal that has passed through the sound volume adjustment section Crbb of the second localized sound processing section 151*b*, the signal that has passed through the filter section Fmlr of the third localized sound processing section 151*c*, and the signal that has passed through the sound volume adjustment section Cmrr of the third localized sound processing section 151*c* are inputted in the adder 152*b*. These six signals are mixed by the adder 152*b*, outputted from a right front output, passed through the DAC 16*b* and the power amplifier 17*b*, and outputted as a sound from the speaker $SP_{FR}$.

Further, the signal that has passed through the filter section Fflb of the first localized sound processing section 151*a*, the signal that has passed through the filter section Ffrb of the first localized sound processing section 151*a*, the signal that has passed through the filter section Fblb of the second localized sound processing section 151*b*, the signal that has passed through the filter section Fbrb of the second localized sound processing section 151*b*, the signal that has passed through the filter section Fmlb of the third localized sound processing section 151*c*, and the signal that has passed through the filter section Fmrb of the third localized sound processing section 151*c* are inputted in the adder 152*c*. These six signals are mixed by the adder 152*c*, outputted from a back output, passed through the DAC 16*c* and the power amplifier 17*c*, and outputted as a sound from the speaker $SP_B$.

As the sound is outputted from each of the speakers $SP_{FL}$, $SP_{FR}$ and $SP_B$, a sound image is formed by the first localized sounds from the sounds based on the signals processed by the first localized sound processing section 151*a*, a sound image is formed by the second localized sounds from the sounds based on the signals processed by the second localized sound processing section 151*b*, and a sound image is formed by the third localized sounds from the sounds based on the signals processed by the third localized sound processing section 151*c*.

Next, referring to FIG. 7, more concrete signal processing rendered by each of the localized sound processing sections 151*a*, 151*b* and 151*c* of the electronic grand piano 1 in accordance with the second embodiment on tone signals of first-third localized sounds, respectively, will be described. FIG. 7 is a schematic diagram showing sound images of localized sounds created by the electronic grand piano 1 in accordance with the second embodiment. In FIG. 7, a sound image $I_F$ denotes a sound image of the first localized sound, a sound image $I_B$ denotes a sound image of the second localized sound, and a sound image $I_M$ denotes a sound image of the third localized sound (a sound to be localized in the middle between the first localized sound and the second localized sound).

The first localized sound processing section 151*a* renders signal processing similar to those of the first embodiment on tone signals inputted in the left input and on tone signals inputted in the right input. Therefore, the sound image $I_F$ of the first localized sounds has a shape similar to that of the first embodiment.

The second localized sound processing section 151*b* also renders signal processing similar to those of the first embodiment on tone signals inputted in the left input and on tone signals inputted in the right input. Therefore, the sound image $I_B$ of the second localized sounds has a shape similar to that of the first embodiment.

On the other hand, tone signals inputted in the left input of the third localized sound processing sections 151*c* (L channel signals of the third localized sounds) are processed with the following settings so as to be localized at the position of the back side speaker $SP_B$.

Settings for tone signals inputted in the left input of the third localized sound processing section 151*c:*

Delay time by the delay section Dmlb=0

Sound volume set by the sound volume adjusting section Cmlb=1

Phase adjusted by the phase adjusting section Pmlb: (Non-Invert)

Sound volume set by the sound volume adjusting section Cmll=0

Sound volume set by the sound volume adjusting section Cmlr=0

Next, tone signals inputted in the right input of the third localized sound processing sections 151*c* (R channel signals of the third localized sounds) are processed with the following settings so as to be localized at the position of the front right side speaker $SP_{FR}$.

Settings for tone signals inputted in the right input of the third localized sound processing section 151*c:*

Delay time by the delay section Dmrr=0

Sound volume set by the sound volume adjusting section Cmrr=1

Sound volume set by the sound volume adjusting section Cmrl=0

Sound volume set by the sound volume adjusting section Cmrb=0

As a result of the signal processing described above rendered by the third localized sound processing section 151*c* on the L channel signals and the R channel signals of the third localized sounds, respectively, a sound image that extends between the front right side speaker $SP_{FR}$ and the back side speaker $SP_B$ (i.e., the sound image indicated by $I_M$) is formed as a sound image of the third localized sounds.

As described above, according to the electronic grand piano 1 of the second embodiment, the sound image of the first localized sounds and the sound image of the second localized sounds are formed in a manner similar to those of the first embodiment, thereby enabling both of the performer P and the audience A to feel the sound images similar in size to those created by a targeted grand piano G. Further, as the third localized sounds such as resonance sounds are localized between the first localized sound and the second localized sound, sounds of the grand piano G can be better simulated.

Next, referring to FIG. 8 and FIG. 9, a third embodiment will be described. In the first embodiment and the second embodiment described above, a single speaker (the speaker $SP_B$) is disposed on the back side of the electronic grand piano 1. In accordance with the third embodiment, two speakers are disposed on the back side (a speaker $SP_{BL}$ and a speaker $SP_{BR}$, as shown in FIG. 9). In the third embodiment to be discussed below, sections that are identical with those of the first and second embodiments will be appended with the same reference numbers, and their description will be omitted.

In the electronic grand piano 1 in accordance with the third embodiment, the back side speaker $SP_B$ in the first and second embodiments is replaced with the speakers $SP_{BL}$ and the speaker $SP_{BR}$. Therefore, instead of the DAC 16*c*, the power amplifier 17*c* and the speaker SPB shown in FIG. 2, a DAC for the back left side to be connected to the DSP 15, a power amplifier for the back left side to be connected to the DAC for the back left side, a speaker on the back left side $SP_{BL}$ to be connected to the power amplifier for the back left side, a DAC for the back right side to be connected to the DSP 15, a power amplifier for the back right side to be connected to the DAC for the back right side, and a speaker on the back right side $SP_{BR}$ to be connected to the power amplifier for the back right side are provided.

Figure 8:
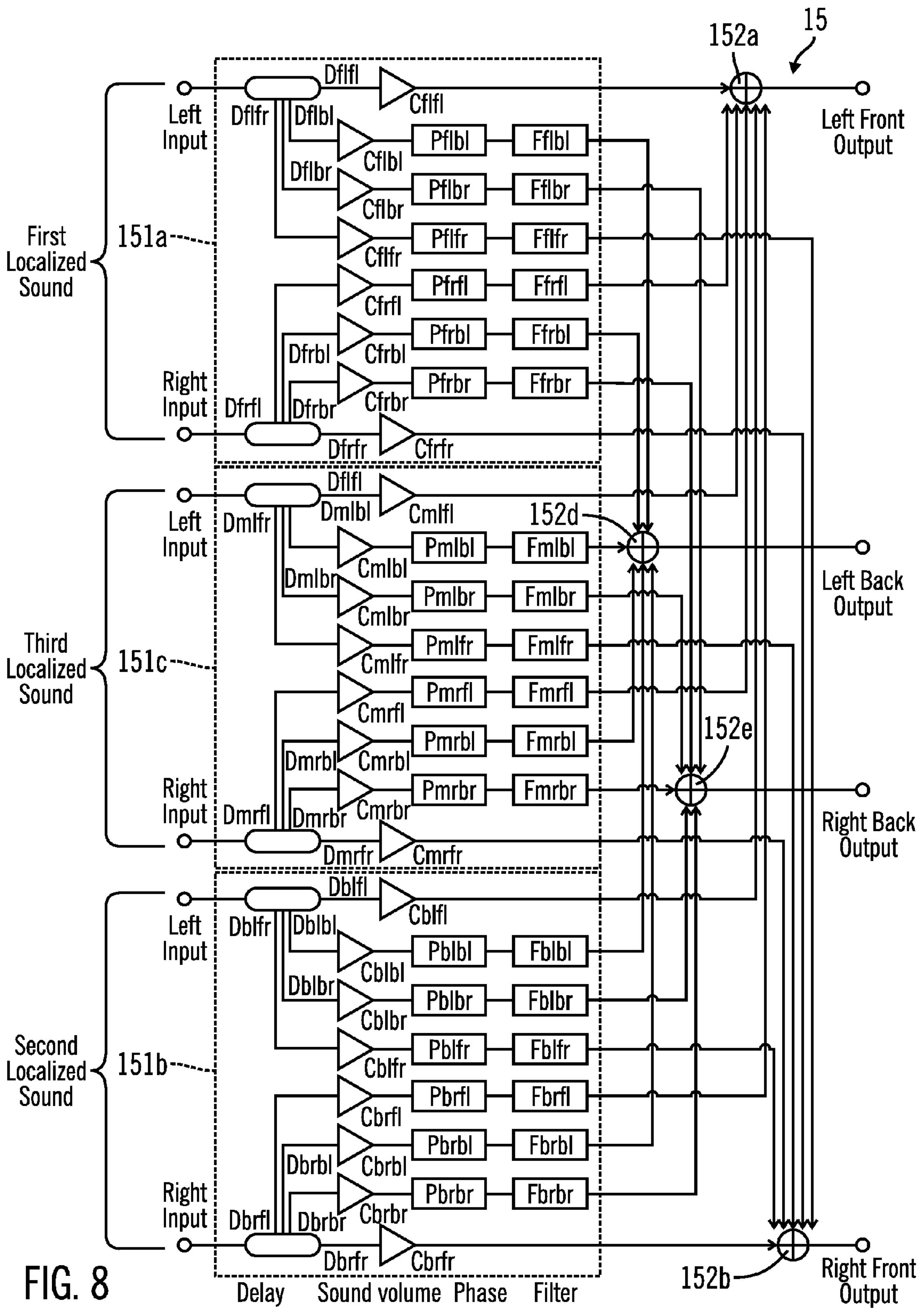
FIG. 8 is a functional block diagram showing functions of a DSP in accordance with a third embodiment.
Figure 9:
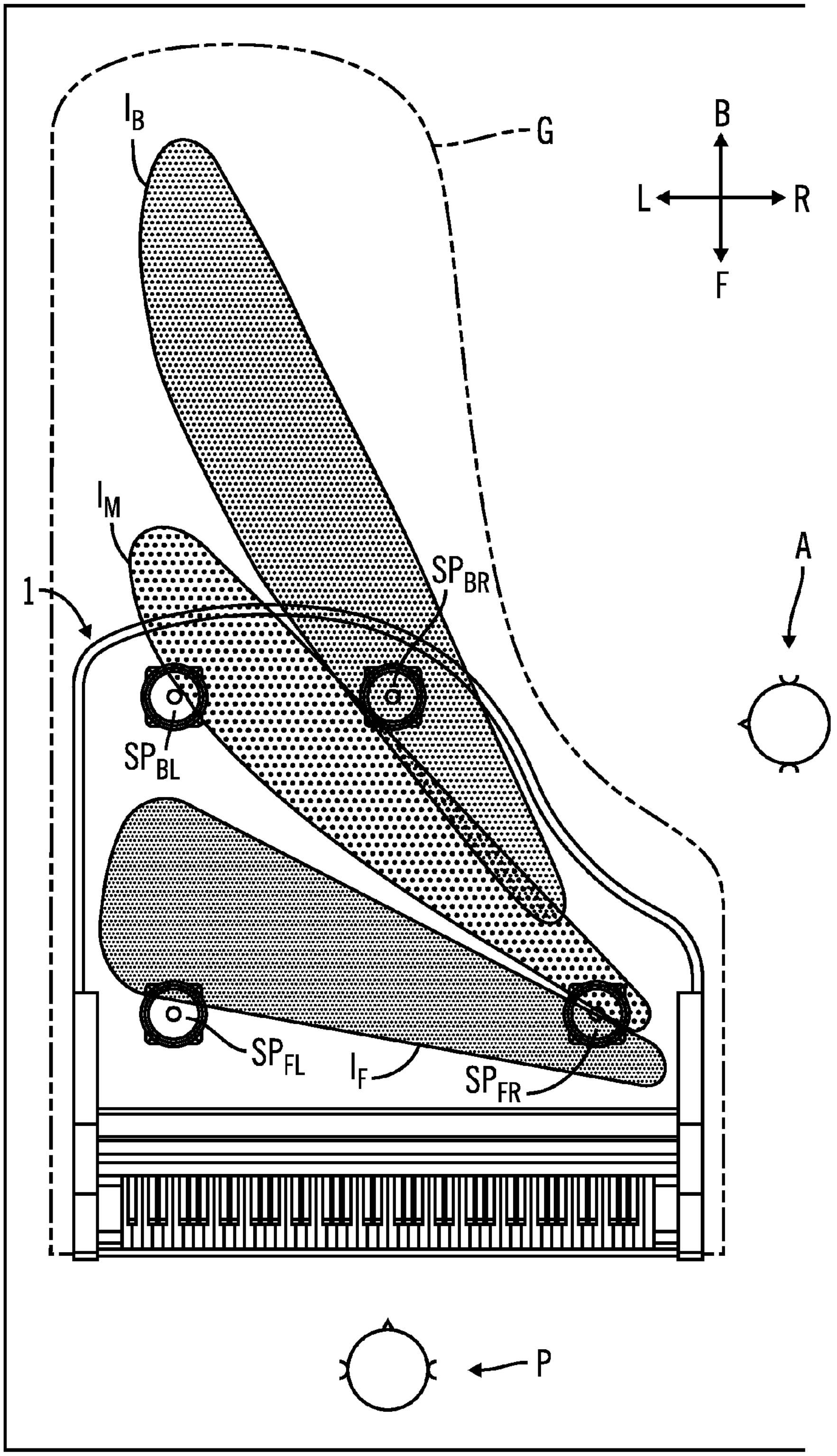
FIG. 9 is a schematic diagram showing sound images of localized sounds formed by an electronic grand piano in accordance with the third embodiment.

FIG. 8 is a functional block diagram showing the functions of the DSP 15 in accordance with the third embodiment. The electronic grand piano 1 of the third embodiment is configured to localize sound images of three kinds of localized sounds to be outputted from the four full-range speakers in total (the speakers $SP_{FL}$, $SP_{FR}$, $SP_{BL}$ and $SP_{BR}$), independently from one another. For this reason, the functional blocks formed in the DSP 15 in accordance with the third embodiment include, like the second embodiment described above, a first localized sound processing section 151*a* that processes tone signals of first localized sounds, a second localized sound processing section 151*b* that processes tone signals of second localized sounds, and a third localized sound processing section 151*c* that processes tone signals of third localized sounds.

Tone signals of the first localized sounds (sounds to be localized on the front side as viewed from the performer P, such as, sounds of the strings) are inputted in the first localized sound processing section 151*a*. The first localized sound processing section 151*a* renders signal processing (delay, sound volume adjustment, phase adjustment and filter processing) on L channel signals of the first localized sounds inputted in the left input and R channel signals of the first localized sounds inputted in the right input, respectively, according to the respective sound output destinations.

More specifically, the first localized sound processing section 151*a* renders delay and sound volume adjustment processing on the L channel signal inputted in the left input at a delay section Dflfl and a sound volume adjusting section Cflfl, respectively, based on settings at the respective sections. Then, the signal that has been rendered with the signal processing is supplied to an adder 152*a* as a signal to be outputted from the speaker $SP_{FL}$ on the front left side.

Also, the first localized sound processing section 151*a* renders delay, volume adjustment, phase adjustment and filter processing on the L channel signal inputted in the left input at a delay section Dα, a sound volume adjustment section Cα, a phase adjustment section Pα and a filter section Fα, respectively, according to settings of the respective sections. It is noted that α represents flbl, flbr or flfr. Then, the signal that has been rendered with these signal processing is supplied to the adder 152*d* as a signal to be outputted from the speaker $SP_{BL}$ on the back left side when α is flbl, supplied to the adder 152*c* as a signal to be outputted from the back right side speaker $SP_{BR}$ when α is flbr, and supplied to the adder 152*b* as a signal to be outputted from the front right side speaker $SP_{FR}$ when α is flfr.

On the other hand, the first localized sound processing section 151*a* renders delay and sound volume adjustment processing on the R channel signal inputted in the right input at a delay section Dfrfr and a sound volume adjusting section Cfrfr, respectively, based on settings at each of the sections. Then, the signal that has been rendered with the signal processing is supplied to the adder 152*b* as a signal to be outputted from the front right side speaker $SP_{FR}$.

Also, the first localized sound processing section 151*a* renders delay, volume adjustment, phase adjustment and filter processing on the R channel signal inputted in the right input at a delay section Dβ, a sound volume adjustment section Cβ, a phase adjustment section Pβ and a filter section Fβ, respectively, according to settings of the respective sections. It is noted that β represents frbr, frbl or frfl. Then, the signal that has been rendered with each of the signal processing is supplied to the adder 152*e* as a signal to be outputted from the back right side speaker $SP_{BR}$ when β is frbr, supplied to the adder 152*d* as a signal to be outputted from the back left side speaker $SP_{BL}$ when β is frbl, and supplied to the adder 152*a* as a signal to be outputted from the speaker $SP_{FL}$ on the front left side when β is frfl.

Tone signals of the second localized sounds (sounds to be localized on the back side as viewed from the performer P, such as, sounds of the soundboard) are inputted in the second localized sound processing section 151*b*. The second localized sound processing section 151*b* renders signal processing (delay, sound volume adjustment, phase adjustment and filter processing) on L channel signals of the second localized sounds inputted in the left input, and R channel signals of the second localized sounds inputted in the right input, according to the respective sound output destinations.

More specifically, the second localized sound processing section 151*b* renders delay and sound volume adjustment processing on the L channel signal inputted in the left input at a delay section Dblfl and a sound volume adjusting section Cblfl, respectively, based on settings at the respective sections. Then, the signal that has been rendered with these signal processing is supplied to the adder 152*a* as a signal to be outputted from the front left side speaker $SP_{FL}$.

Also, the second localized sound processing section 151*b* renders delay, volume adjustment, phase adjustment and filter processing on the L channel signal inputted in the left input at a delay section Dγ, a sound volume adjustment section Cγ, a phase adjustment section Pγ and a filter section Fγ, respectively, according to settings of the respective sections. It is noted that γ represents blbl, blbr or blfr. Then, the signal that has been rendered with these signal processing is supplied to the adder 152*d* as a signal to be outputted from the back left side speaker $SP_{BL}$ when γ is blbl, supplied to the adder 152*e* as a signal to be outputted from the back right side speaker $SP_{BR}$ when γ is blbr, and supplied to the adder 152*b* as a signal to be outputted from the front right side speaker $SP_{FR}$ when γ is blfr.

On the other hand, the second localized sound processing section 151*b* renders delay and sound volume adjustment processing on the R channel signal inputted in the right input at a delay section Dbrfr and a sound volume adjusting section Cbrfr, respectively, based on settings at the respective sections. Then, the signal that has been rendered with these signal processing is supplied to the adder 152*b* as a signal to be outputted from the front right side speaker $SP_{FR}$.

Also, the second localized sound processing section 151*b* renders delay, volume adjustment, phase adjustment and filter processing on the R channel signal inputted in the right input at a delay section Dδ, a sound volume adjustment section Cδ, a phase adjustment section Pδ and a filter section Fδ, respectively, according to settings of the respective sections. It is noted that δ represents brbr, brbl or brfl. Then, the signal that has been rendered with these signal processing is supplied to the adder 152*e* as a signal to be outputted from the back right side speaker $SP_{BR}$ when δ is brbr, supplied to the adder 152*d* as a signal to be outputted from the back left side speaker $SP_{BL}$ when δ is brbl, and supplied to the adder 152*a* as a signal to be outputted from the front left side speaker $SP_{FL}$ when δ is brfl.

Tone signals of the third localized sounds (sounds to be localized in the middle between the first localized sounds and the second localized sound, such as, sounds of the resonance strings) are inputted in the third localized sound processing section 151*c*. The third localized sound processing section 151*c* renders signal processing (delay, sound volume adjustment, phase adjustment and filter processing) on L channel signals of the third localized sounds inputted in the left input, and R channel signals of the third localized sounds inputted in the right input, according to the respective sound output destinations.

More specifically, the third localized sound processing section 151*c* renders delay and sound volume adjustment processing on the L channel signal inputted in the left input at a delay section Dmlfl and a sound volume adjusting section Cmlfl, respectively, based on settings at the respective sections. Then, the signal that has been rendered with these signal processing is supplied to the adder 152*a* as a signal to be outputted from the front left side speaker $SP_{FL}$.

Also, the third localized sound processing section 151*c* renders delay, volume adjustment, phase adjustment and filter processing on the L channel signal inputted in the left input at a delay section Dϵ, a sound volume adjustment section Cϵ, a phase adjustment section Pϵ and a filter section Fϵ, respectively, according to settings of the respective sections. It is noted that ϵ represents mlbl, mlbr or mlfr. Then, the signal that has been rendered with these signal processing is supplied to the adder 152*d* as a signal to be outputted from the back left side speaker $SP_{BL}$ when ϵ is mlbl, supplied to the adder 152*e* as a signal to be outputted from the back right side speaker $SP_{BR}$ when ϵ is mlbr, and supplied to the adder 152*b* as a signal to be outputted from the front right side speaker $SP_{FR}$ when ϵ is mlfr.

On the other hand, the third localized sound processing section 151*c* renders delay and sound volume adjustment processing on the R channel signal inputted in the right input at a delay section Dmrfr and a sound volume adjusting section Cmrfr, respectively, based on settings at each of the sections. Then, the signal that has been rendered with these signal processing is supplied to the adder 152*b* as a signal to be outputted from the front right side speaker $SP_{FR}$.

Also, the third localized sound processing section 151*c* renders delay, volume adjustment, phase adjustment and filter processing on the R channel signal inputted in the right input at a delay section Dζ, a sound volume adjustment section Cζ, a phase adjustment section Pζ and a filter section Fζ, respectively, according to settings of each of the respective sections. It is noted that ζ represents mrbr, mrbl or mrfl. Then, the signal that has been rendered with these signal processing is supplied to the adder 152*e* as a signal to be outputted from the back right side speaker $SP_{BR}$ when ζ is mrbr, supplied to the adder 152*d* as a signal to be outputted from the back left side speaker $SP_{BL}$ when ζ is mrbl, and supplied to the adder 152*a* as a signal to be outputted from the front left side speaker $SP_{FL}$ when ζ is mrfl.

As described above, the signal that has passed through the sound volume adjusting section Cflfl of the first localized sound processing section 151*a* (the signal based on the L channel signal of the first localized sound), the signal that has passed through the filter section Ffrfl of the first localized sound processing section 151*a* (the signal based on the R channel signal of the first localized sound), the signal that has passed through the sound volume adjusting section Cblfl of the second localized sound processing section 151*b* (the signal based on the L channel signal of the second localized sound), the signal that has passed through the filter section Fbrfl of the second localized sound processing section 151*b* (the signal based on the R channel signal of the second localized sound), the signal that has passed through the sound volume adjusting section Cmlfl of the third localized sound processing section 151*c* (the signal based on the L channel signal of the third localized sound), and the signal that has passed through the filter section Fmrfl of the third localized sound processing section 151*c* (the signal based on the R channel signal of the third localized sound) are inputted in the adder 152*a*. These six signals are mixed by the adder 152*a*, and outputted from a left front output. Then, the signal passes through the DAC 16*a* and the power amplifier 17*a*, and is outputted as a sound from the speaker $SP_{FL}$.

Also, the signal that has passed through the filter section Fflfr of the first localized sound processing section 151*a*, the signal that has passed through the sound volume adjustment section Cfrfr of the first localized sound processing section 151*a*, the signal that has passed through the filter section Fblfr of the second localized sound processing section 151*b*, the signal that has passed through the sound volume adjustment section Cbrfr of the second localized sound processing section 151*b*, the signal that has passed through the filter section Fmlfr of the third localized sound processing section 151*c*, and the signal that has passed through the sound volume adjustment section Cmrfr of the third localized sound processing section 151*c* are inputted in the adder 152*b*. These six signals are mixed by the adder 152*b*, outputted from a right front output. Then, the single passes through the DAC 16*b* and the power amplifier 17*b*, and is outputted as a sound from the speaker $SP_{FR}$.

Further, the signal that has passed through the filter section Fflbl of the first localized sound processing section 151*a*, the signal that has passed through the filter section Ffrbl of the first localized sound processing section 151*a*, the signal that has passed through the filter section Fblbl of the second localized sound processing section 151*b*, the signal that has passed through the filter section Fbrbl of the second localized sound processing section 151*b*, the signal that has passed through the filter section Fmlbl of the third localized sound processing section 151*c*, and the signal that has passed through the filter section Fmrbl of the third localized sound processing section 151*c* are inputted in the adder 152*d*. These six signals are mixed by the adder 152*d*, and outputted from a left back output. Then, the signal passes through the DAC for the back left side and the power amplifier for the back left side (not shown), and is outputted as a sound from the speaker $SP_{BL}$.

Further, the signal that has passed through the filter section Fflbr of the first localized sound processing section 151*a*, the signal that has passed through the filter section Ffrbr of the first localized sound processing section 151*a*, the signal that has passed through the filter section Fblbr of the second localized sound processing section 151*b*, the signal that has passed through the filter section Fbrbr of the second localized sound processing section 151*b*, the signal that has passed through the filter section Fmlbr of the third localized sound processing section 151*c*, and the signal that has passed through the filter section Fmrbr of the third localized sound processing section 151*c* are inputted in the adder 152*e*. These six signals are mixed by the adder 152*e*, and outputted from a right back output. Then, the signal passes through the DAC for the back right side and the power amplifier for the back right side (not shown), and is outputted as a sound from the speaker $SP_{BR}$.

As the sound is outputted from each of the speakers $SP_{FL}$, $SP_{FR}$ and $SP_{BL}$ and $SP_{BR}$, a sound image is formed by the first localized sounds from the sounds based on the signals processed by the first localized sound processing section 151*a*, a sound image is formed by the second localized sounds from the sounds based on the signals processed by the second localized sound processing section 151*b*, and a sound image is formed by the third localized sounds from the sounds based on the signals processed by the third localized sound processing section 151*c*.

Next, referring to FIG. 9, more concrete signal processing rendered by each of the localized sound processing sections 151*a*, 151*b* and 151*c* of the electronic grand piano 1 in accordance with the third embodiment on tone signals of first-third localized sounds, respectively, will be described. FIG. 9 is a schematic diagram showing sound images of localized sounds created by the electronic grand piano 1 in accordance with the third embodiment. In FIG. 9, a sound image $I_F$ denotes a sound image of the first localized sound, a sound image $I_B$ denotes a sound image of the second localized sound, and a sound image $I_M$ denotes a sound image of the third localized sound.

First, the tone signals inputted in the left input of the first localized sound processing section 151*a* (the L channel signals of the first localized sounds) are processed, based on Setting 5, like the first embodiment, such that the signal to be outputted from the front left side speaker $SP_{FL}$ and the signal to be outputted from the back left side speaker $SP_{BL}$ are not mutually delayed but have mutually opposite phases. By this, a sound image expanding between the front left side speaker $SP_{FL}$ and the back left side speaker $SP_{BL}$ is formed. In this instance, by slightly lowering the sound volume of the back left side speaker $SP_{BL}$, the sound image is slightly shifted closer to the front left side speaker $SP_{FL}$.

Further, by outputting from the front right side speaker $SP_{FR}$ a cross-talk canceling signal that is opposite in phase and delayed with respect to the front left side speaker $SP_{FL}$, the above-described sound image expanding between the front left side speaker $SP_{FL}$ and the back left side speaker $SP_{BL}$ and located slightly closer to the front left side speaker $SP_{FL}$ is positioned slightly on the left side of a line connecting between the speaker $SP_{FL}$ and the speaker $SP_{BL}$. It is noted that the sound volume of the back right side speaker $SP_{BR}$ is zero.

In other words, by the settings listed below, based on the L channel signals of the first localized sounds, a sound image expanding between the front left side speaker $SP_{FL}$ and the back left side speaker $SP_{BL}$, slightly shifted toward the front left side speaker $SP_{FL}$, and located slightly on the left side of the line connecting between the speaker $SP_{FL}$ and the speaker $SP_{BL}$ is formed. It is noted that the phase of the signal to be outputted from the front left side speaker $SP_{FL}$ is set as a reference (non-inversion).

Settings for tone signals inputted in the left input of the first localized sound processing section 151*a:*

Settings based on Setting 5:

- Delay time by the delay section Dflbl=Delay time by the delay section Dflfl
- Sound volume set by the sound volume adjusting section Cflbl Sound volume set by the sound volume adjusting section Cflfl
- Phase inverted by the phase adjusting section Pflbl (Invert)

Output of a cross-talk canceling signal

- Delay time by the delay section Dflfr>Delay time by the delay section Dflfl
- Sound volume set by the sound volume adjusting section Cflfr<Sound volume set by the sound volume adjusting section Cflfl
- Phase inverted by the phase adjusting section Pflfr (Invert)

Other

- Sound volume set by the sound volume adjusting section Cflrr=0

Next, the tone signals inputted in the right input of the first localized sound processing section 151*a* (the R channel signals of the first localized sounds) are processed, based on Setting 7, like the first embodiment, such that the signal to be outputted from the front right side speaker $SP_{FR}$ and the signal to be outputted from the back right side speaker $SP_{BR}$ have mutually opposite phases, and the signal to be outputted from the speaker $SP_{BR}$ is delayed behind the signal to be outputted from the speaker $SP_{FR}$. By this, a sound image located on a line connecting between the front right side speaker $SP_{FR}$ and the back right side speaker $SP_{BR}$ and on the front side of the speaker $SP_{FR}$ is formed. In this instance, the level (sound volume) of the signal to be outputted from the back right side speaker $SP_{BR}$ is lowered, thereby adjusting the location of the sound image to a position closer to the speaker $SP_{FR}$. It is noted that the sound volume of the front left side speaker $SP_{FL}$ and the back left side speaker $SP_{BL}$ is zero.

In other words, by the settings listed below, based on the R channel signals of the first localized sounds, a sound image located on the line connecting between the front right side speaker $SP_{FR}$ and the back right side speaker $SP_{BR}$, and slightly on the front side of the speaker $SP_{FR}$ is formed. It is noted that the phase of the signal to be outputted from the front right side speaker $SP_{FR}$ is set as a reference (non-inversion).

Settings for tone signals inputted in the right input of the first localized sound processing section 151*a:*

Settings based on Setting 7:

- Delay time by the delay section Dfrbr>Delay time by the delay section Dfrfr
- Sound volume set by the sound volume adjusting section Cfrbr<Sound volume set by the sound volume adjusting section Cfrfr
- Phase inverted by the phase adjusting section Pfrbr (Invert)

Other

- Sound volume set by the sound volume adjusting section Cfrbl=0
- Sound volume set by the sound volume adjusting section Cfrfl=0

As a result of the signal processing described above rendered by the first localized sound processing section 151*a* on the L channel signals and the R channel signals of the first localized sounds, respectively, a sound image is formed between the speakers $SP_{FL}$, $SP_{FR}$, $SP_{BL}$, slightly shifted closer toward the front side speakers ($SP_{FL}$ and $SP_{FR}$), expanding slightly on the left side of a line connecting between the speaker $SP_{FL}$ and the speaker $SP_{BL}$, and expanding slightly on the front side of a line connecting between the speaker $SP_{FR}$ and the speaker $SP_{BR}$ (i.e., the sound image indicated by $I_F$) is formed as a sound image of the first localized sounds.

Next, the tone signals inputted in the left input of the second localized sound processing section 151*b* (the L channel signals of the second localized sounds) are processed, based on Setting 6, like the first embodiment, such that the signal to be outputted from the front left side speaker $SP_{FL}$ and the signal to be outputted from the back left side speaker $SP_{BL}$ have mutually opposite phases, and the signal to be outputted from the speaker $SP_{FL}$ is delayed behind the signal to be outputted from the speaker $SP_{BL}$. By this, a sound image positioned on a line connecting between the front left side speaker $SP_{FL}$ and the back left side speaker $SP_{BL}$, and located on the back side of the speaker $SP_{BL}$ is formed. In this instance, by lowering the level (sound volume) of the signal to be outputted from the front left side speaker $SP_{FL}$, the sound image is adjusted to a position closer to the speaker $SP_{BL}$. It is noted that the sound volume of the front right side speaker $SP_{FR}$ and the back right side speaker $SP_{BR}$ is zero.

In other words, by the settings listed below, based on the L channel signals of the second localized sounds, a sound image located on the line connecting between the front left side speaker $SP_{FL}$ and the back left side speaker $SP_{BL}$, and on the back side of the speaker $SP_{BL}$ is formed. It is noted that the phase of the signal to be outputted from the front left side speaker $SP_{FL}$ is set as a reference (non-inversion).

Settings for tone signals inputted in the left input of the second localized sound processing section 151*b:*

Settings based on Setting 6:

- Delay time by the delay section Dblbl<Delay time by the delay section Dblfl
- Sound volume set by the sound volume adjusting section Cblbl>Sound volume set by the sound volume adjusting section Cblfl
- Phase inverted by the phase adjusting section Pblbl (Invert)

Other

- Sound volume set by the sound volume adjusting section Cblfr=0
- Sound volume set by the sound volume adjusting section Cblbr=0

Next, the tone signals inputted in the right input of the second localized sound processing section 151*b* (the R channel signals of the second localized sounds) are processed, based on Setting 2, like the first embodiment, such that the signal to be outputted from the front right side speaker $SP_{FR}$ and the signal to be outputted from the back right side speaker $SP_{BR}$ are in the same phase, and the sound volume of the front right side speaker $SP_{FR}$ is set greater than that of the back right side speaker $SP_{BR}$. By this, a sound image located between the front right side speaker $SP_{FR}$ and the back right side speaker $SP_{BR}$, and toward the side of the speaker $SP_{FR}$ is formed. It is noted that the sound volume of the front left side speaker $SP_{FL}$ and the back left side speaker $SP_{BL}$ is zero.

In other words, by the settings listed below, based on the R channel signals of the second localized sounds, a sound image located between the front right side speaker $SP_{FR}$ and the back right side speaker $SP_{BR}$, and on the side of the speaker $SP_{FR}$ is formed. It is noted that the phase of the signal to be outputted from the front right side speaker $SP_{FR}$ is set as a reference (non-inversion).

Settings for tone signals inputted in the right input of the second localized sound processing section 151*b:*

Settings based on Setting 2:

- Delay time by the delay section Dbrbr=Delay time by the delay section Dbrfr
- Sound volume set by the sound volume adjusting section Cbrbr<Sound volume set by the sound volume adjusting section Cbrfr
- Phase adjusted by the phase adjusting section Pbrbr: (NonInvert)

Other

- Sound volume set by the sound volume adjusting section Cbrfl=0
- Sound volume set by the sound volume adjusting section Cbrbl=0

As a result of the signal processing described above rendered by the second localized sound processing section 151*b* on the L channel signals and the R channel signals of the second localized sounds, respectively, a long and narrow sound image that expands from the side of the front right side speaker $SP_{FR}$ to a position on the back of the speaker $SP_{BL}$ on a line connecting between the front left side speaker $SP_{FL}$ and the back left side speaker $SP_{BL}$ (i.e., the sound image indicated by $I_B$) is formed as a sound image of the second localized sounds.

Next, the tone signals inputted in the left input of the third localized sound processing section 151*c* (the L channel signals of the third localized sounds) are processed, based on Setting 6, like the left channel signals of the second localized sounds, such that the signal to be outputted from the front left side speaker $SP_{FL}$ and the signal to be outputted from the back left side speaker $SP_{BL}$ have mutually opposite phases, and the signal to be outputted from the speaker $SP_{FL}$ is delayed behind the signal to be outputted from the speaker $SP_{BL}$, thereby localizing a sound image positioned on a line connecting between the front left side speaker $SP_{FL}$ and the back left side speaker $SP_{BL}$, and located on the back side of the speaker $SP_{BL}$. In addition, the sound image is adjusted to a position closer to the speaker $SP_{BL}$ by lowering the level (sound volume) of the signal to be outputted from the front left side speaker $SP_{FL}$. It is noted that the sound volume of the front right side speaker $SP_{FR}$ and the back right side speaker $SP_{BR}$ is zero.

In other words, by the settings listed below, based on the L channel signals of the third localized sounds, a sound image located on the line connecting between the front left side speaker $SP_{FL}$ and the back left side speaker $SP_{BL}$, and on the back side of the speaker $SP_{BL}$ is formed. In order to localize the sound image by the L channel signal of the third localized sound at a position much closer, as compared to the sound image by the L channel signal of the second localized sound, to the back left side speaker $SP_{BL}$, the sound volume of the speaker $SP_{FL}$ is lowered even further. It is noted that the phase of the signal to be outputted from the front left side speaker $SP_{FL}$ is set as a reference (non-inversion).

Settings for tone signals inputted in the left input of the third localized sound processing section 151*c:*

Settings based on Setting 6:

- Delay time by the delay section Dmlbl<Delay time by the delay section Dmlfl
- Sound volume set by the sound volume adjusting section Cmlbl>Sound volume set by the sound volume adjusting section Cmlfl
- Phase inverted by the phase adjusting section Pmlbl (Invert)

Other

- Sound volume set by the sound volume adjusting section Cmlfr=0
- Sound volume set by the sound volume adjusting section Cmlbr=0

Next, the tone signals inputted in the right input of the third localized sound processing section 151*c* (the R channel signals of the third localized sounds) are processed, such that the signal to be outputted from the front left side speaker $SP_{FL}$ is opposite in phase and delayed with respect to the signal to be outputted from the front right side speaker $SP_{FR}$. This causes the front left side speaker $SP_{FL}$ to output slightly a cross-talk canceling signal. Therefore, a sound image formed by the R channel signals of the third localized sounds is localized at a position slightly on the right side of the front right side speaker $SP_{FR}$. The settings for the R channel signals of the third localized sounds are summarized below. It is noted that the phase of the signal to be outputted from the front right side speaker $SP_{FR}$ is set as a reference (non-inversion).

Settings for tone signals inputted in the right input of the third localized sound processing section 151*c:*

Output of cross-talk canceling signal

- Delay time by the delay section Dmrfl>Delay time by the delay section Dmrfr
- Sound volume set by the sound volume adjusting section Cmrfr<Sound volume set by the sound volume adjusting section Cmrfr
- Phase inverted by the phase adjusting section Pmrfl (Invert)

Other

- Sound volume set by the sound volume adjusting section Cmrbl=0
- Sound volume set by the sound volume adjusting section Cmrbr=0

As a result of the signal processing described above rendered by the third localized sound processing section 151*c* on the L channel signals and the R channel signals of the third localized sounds, respectively, a long and narrow sound image that extends from a location slightly on the right side of the front right side speaker $SP_{FR}$ toward a position on the back side of the speaker $SP_{BL}$ on an extended line connecting between the front left side speaker $SP_{FL}$ and the back left side speaker $SP_{BL}$, and localized on the front side of the sound image of the second localized sounds (the sound image $I_B$) (i.e., the sound image indicated by $I_M$) is formed as a sound image of the third localized sounds.

As described above, by the electronic grand piano 1 in accordance with the third embodiment, the sound images of the respective localized sounds ($I_F$, $I_B$ and $I_M$) perceived by both of the performer P and the audience A can be formed to be wider (larger) than the arrangement of the speakers $SP_{FL}$, $SP_{FR}$, $SP_{BL}$ and $SP_{BR}$ by the signal processing rendered by the first, second and third localized sound processing sections 151*a*, 151*b* and 151*c*. Therefore, like the first and second embodiments described above, although the overall size of the electronic grand piano 1 is compact, compared to the size of the grand piano G, it is possible to give an impression to both of the performer P and the audience A that the sound image created has the size similar to that of the targeted grand piano G. Further, as a greater number of the speakers $SP_{FL}$, $SP_{FR}$, $SP_{BL}$ and $SP_{BR}$ are provided, the size and the location of each of the localized sounds can be set in greater detail, such that the grand piano G can be more excellently simulated.

The invention has been described based on some embodiments, but the invention is not limited to the embodiments described above, and it can be readily presumed that various changes and improvements can be made within the range that does not depart from the subject matter of the invention.

For example, each of the embodiments described above is configured to use the sound source 14 as a sampling sound source, and generate stereophonic tone signals by sampling sound source waveforms stored in the waveform memory 14*a*. However, the sound source 14 may be formed from a sound source that generates tone signals by synthesis (for example, a physical modeling sound source), and configured to generate stereophonic tone signals of each of the element sounds such as sounds of the strings, sounds of the soundboard and the like by synthesis. Also, a sampling sound source and a physical modeling sound source may be used together, and may be configured to generate tone signals of a part of element sounds (for example, thump sounds) by sampling with the sampling sound source, and generate other element sounds (for example, sounds of the strings) by synthesis with the physical modeling sound source. Alternatively, stereophonic tone signals of piano sounds (whole sounds without being separated into element sounds) may be generated by sampling or synthesis, and tone signals of each of the element sounds may be generated by signal processing.

Also, in accordance with each of the embodiments described above, waveform data of each of separated element sounds are stored respectively in the waveform memory 14*a*, and tone signals of each of the element sounds are generated based on waveform data of each of the element sounds. Instead of such a configuration, waveform data of piano sounds may be stored in the waveform memory 14*a*, the waveform data may be separated by signal processing into waveform data of each of the element sounds, and tone signals of each of the element sounds may be generated.

Also, each of the embodiments described above is configured to use stereophonic waveform data sampled by one-point recording. However, stereophonic waveform data obtained by any one of other recording methods, for example, microphones may be arranged around a grand piano, and stereophonic waveform data sampled by each of the microphones may be mixed and used.

The number of speakers arranged is three in the first and second embodiments described above, and four in the third embodiment. However, at least two speakers on the front side and at least one speaker on the back side need to be arranged, and the number of speakers to be arranged may be four or more. It is noted that not only full-range speakers but also tweeters and woofers may be included.

Further, in the first embodiment described above, stereophonic tone signals of two kinds of localized sounds are respectively processed and, in the second and third embodiments described above, stereophonic tone signals of three kinds of localized sounds are respectively processed. However, four or more kinds of localized sounds may be used, and stereophonic tone signals of each of the localized sounds may be processed for each of the destination speakers and outputted from each of the speakers, respectively.

Further, each of the embodiments described above is discussed as to forming sound images, with a front side speaker ($SP_{FL}$ or $SP_{FR}$) and a back side speaker ($SP_B$, $SP_{BL}$ or $SP_{BR}$), exceeding the front side speaker or the back side speaker. However, output signals of left and right speakers (for example, the front left and right side speakers $SP_{FL}$ and $SP_{FR}$) may be subject to delay, sound volume and phase adjustment processing, whereby sound images exceeding the right side speaker or the left side speaker can be formed. Also, depending on the position and the shape of a desired sound image, combinations of target speakers may be appropriately set.

Also, each of the embodiments described above is configured such that the delay, the sound volume (level) and the phase of each signal to be outputted to each of the speakers ($SP_{FL}$, $SP_{FR}$, $SP_B$, $SP_{BL}$, $SP_{BR}$) at an output destination are suitably adjusted, thereby adjusting the width and the position of a sound image. However, according to each of the speakers ($SP_{FL}$, $SP_{FR}$, $SP_B$, $SP_{BL}$, $SP_{BR}$) at an output destination, a filter section (for example, the filter section Fbrb) may be configured to cause the corresponding one of the speakers to output a bandwidth of specific frequency characteristics. By this, frequency characteristics of signals to be outputted from each of the speakers may be made different for each input signal, thereby also enabling a sound image to have a certain expansion.

Also, in each of the embodiments described above, the phase of a signal to be outputted from a front side speaker (the speaker $SP_{FL}$ or the speaker $SP_{FR}$) is set to be non-inverted and as reference. However, the phase of a signal to be outputted from a back side speaker (the speaker $SP_B$, the speaker $SP_{BL}$, or the speaker $SP_{BR}$) may be set as reference.

What is claimed is:

1. An electronic keyboard musical instrument comprising:

a keyboard having a plurality of keys, and outputting tone information corresponding to depression of the keys;

a casing having a planar region defined by a surrounding wall, expanding in a direction from a front side to a back side and from a right side to a left side with respect to the keyboard as viewed from a performer depressing the keys;

at least three speakers that are disposed in the planar region of the casing, and output tones corresponding to tone signals based on depression of the keys by the performer, wherein the at least three speakers include at least two first speakers disposed on the left and right sides of the front side of the electronic keyboard musical instrument as viewed from the performer, and at least one second speaker disposed on the back side as viewed from the performer separated from the first speakers;

a tone signal generation device that generates stereophonic tone signals according to tone information outputted from the keyboard; and a signal processing device that processes the stereophonic tone signals generated by the tone signal generation device according to the arrangement of each of the at least three speakers, respectively, and outputs the processed signals to corresponding ones of the speakers, wherein the signal processing device includes a first localized sound processing section and a second localized sound processing section, wherein each of the first and second localized sound processing sections render processing on left channel signals and right channel signals composing the stereophonic tone signals, wherein the rendered processing comprises a combination of at least one of a delay, a volume level and a phase processing on the left and right channel signals to generate signals, wherein the first localized sound processing section and the second localized sound processing section process the left and right channel signals independent of the processing by the second localized sound processing section and the first localized sound processing section, respectively, to produce different signals outputted to each of the at least three speakers, so as to form sound images outside a region surrounded by the at least three speakers, without depending on listening positions.

2. The electronic keyboard musical instrument of claim 1, wherein the signal processing device includes a first signal processing device that renders processing on a signal to be outputted to a reference speaker among the at least three speakers, and a signal to be outputted to another speaker different from the reference speaker to have a relation in which phases thereof are opposite each other, one of the signals is delayed behind the other, and the delayed signal has a volume level lower than a volume level of the other signal.

3. The electronic keyboard musical instrument of claim 2, wherein the first signal processing device renders, for at least one of the left channel signals and the right channel signals, processing on the signal to be outputted to one of the first speakers and the signal to be outputted to one of the second speakers to have a relation such that the phases thereof are opposite each other, one of the signals is delayed behind the other, and the delayed signal has a volume level lower than a volume level of the other signal.

4. The electronic keyboard musical instrument of claim 3, wherein the first signal processing device renders processing on the left channel signals, such that the phase of the signal to be outputted to the first speaker and the phase of the signal to be outputted to the second speaker are opposite each other, the signal to be outputted to the first speaker is delayed behind the signal to be outputted to the second speaker, and the volume level of the signal to be outputted to the first speaker is lower than the volume level of the signal to be outputted to the second speaker.

5. The electronic keyboard musical instrument of claim 3, wherein the first signal processing device renders processing on the right channel signals, such that the phase of the signal to be outputted to the first speaker and the phase of the signal to be outputted to the second speaker are opposite each other, the signal to be outputted to the second speaker is delayed behind the signal to be outputted to the first speaker, and the volume level of the signal to be outputted to the second speaker is lower than the volume level of the signal to be outputted to the first speaker.

6. The electronic keyboard musical instrument of claim 4, wherein the tone signal generation device generates stereophonic tone signals corresponding to tone information outputted from the keyboard for each of a plurality of predetermined localizations, the signal processing section processes the stereophonic tone signals for each of the localizations, and the first signal processing device processes left channel signals of the tone signals to be localized on the back side as viewed from the performer.

7. The electronic keyboard musical instrument of claim 5, wherein the tone signal generation device generates stereophonic tone signals corresponding to tone information outputted from the keyboard for each of a plurality of predetermined localizations, the signal processing device processes the stereophonic tone signals for each of the localizations, and the first signal processing device processes right channel signals of the tone signals to be localized on the front side of the electronic keyboard musical instrument as viewed from the performer such that the phase of a signal to be outputted to the first speaker disposed on the right side of the electronic keyboard musical instrument as viewed from the performer and the phase of a signal to be outputted to the second speaker are mutually in opposite phases, the signal to be outputted to the second speaker is delayed with respect to the signal to be outputted to the first speaker disposed on the right side, and the volume level of the signal to be outputted to the second speaker is less than the volume level of the signal to be outputted to the first speaker disposed on the right side.

8. The electronic keyboard musical instrument of claim 5, wherein the signal processing device includes a second signal processing device that processes left channel signals of the tone signals to be localized on the front side, as viewed from the performer, such that the phase of a signal to be outputted to the first speaker disposed on the left side and the phase of a signal to be outputted to the second speaker are mutually in opposite phases, and the signal to be outputted to the first speaker disposed on the left side and the signal to be outputted to the second speaker are not delayed from one another, and a third signal processing device that renders processing on left channel signals of the tone signals to be localized on a front side as viewed from the performer, and processes the signal to be outputted to the first speaker disposed on the right side as viewed from the performer, such that the signal to be outputted to the first speaker disposed on the right side becomes to be a cross-talk canceling signal with respect to the signal to be outputted to the first speaker disposed on the left side which is processed by the second signal processing device.

9. The electronic keyboard musical instrument of claim 2, wherein the first signal processing device renders processing, with the first speaker set as the reference speaker, the phase of a signal to be outputted to the first speaker being non-inverted, and the phase of a signal to be outputted to the second speaker being inverted.

10. An electronic musical instrument having a front side, back side, right side, and left side with respect to a perspective of a performer of the electronic musical instrument, comprising:

a planar surface having a first speaker positioned on the front side and the left side, a second speaker positioned on the front side and the right side, and a third speaker positioned on the back side;

a first localized sound processing section for receiving left and right channel signals of tone signals assigned as first localized sounds and applying first adjustments to the left and the right channel signals to produce a first group of sound signals to at least two of the first speaker, the second speaker and the third speaker to form a first sound image; and a second localized sound processing section for receiving the left and the right channel signals of tone signals assigned as second localized sounds and applying second adjustments, different from the first adjustments, to the left and the right channel signals to produce a second group of sound signals, different from the first group of signals, to at least two of the first speaker, the second speaker and the third speaker to form a second sound image, wherein the first localized sound processing section and the second localized sound processing section process the left and right channel signals independent of the second localized sound processing section and the first localized sound processing section, respectively, to produce the different first and second group of sound signals.

11. The electronic musical instrument of claim 10, further comprising:

a first adder to mix the first group of sound signals produced by the first localized sound processing section and the second group of sound signals produced by the second localized sound processing section to produce first sound signals to output to the first speaker;

a second adder to mix the first group of sound signals produced by the first localized sound processing section and the second group of sound signals produced by the second localized sound processing section to produce second sound signals to output to the third speaker; and a third adder to mix the first group of sound signals produced by the first localized sound processing section and the second group of sound signals produced by the second localized sound processing section to produce third sound signals to output to the third speaker.

12. The electronic musical instrument of claim 11, wherein the first and second localized sound processing sections each have a left input and right input to process the left and right channel signals, respectively.

13. The electronic musical instrument of claim 11, wherein the first and second localized sound processing sections processes the left and right channel signals to produce the first and second groups of sound signals to the first, second and third adders.

14. The electronic musical instrument of claim 10, wherein the first and second localized sound processing sections render delay, volume adjustment, phase adjustment, and filter processing on the received left and right channel signals to produce the first and second groups of sound signals, respectively.

15. The electronic musical instrument of claim 10, wherein the first and second localized sound processing sections implement a plurality of settings, wherein each setting provides at least one different value from other of the settings for at least one of sound volume levels, phases, and delays for the sound signals, wherein each setting results in different shapes and positions of the first and second sound images produced by the first and second localized sound processing sections.

16. The electronic musical instrument of claim 15, wherein the settings for at least one front speaker, comprising at least one of the first speaker and the second speaker, and the third speaker include at least one of the settings that are a member of a set of settings comprising:

a first setting comprising a sound volume level of the at least one front speaker that is less than a sound volume level of the third speaker and a same delay time and phase for the sound signals for the at least one front speaker and the third speaker;

a second setting comprising a sound volume level of the at least one front speaker that is greater than a sound volume level of the third speaker and a same delay time and phase for the sound signals for the at least one front speaker and the third speaker;

a third setting comprising a same phase and sound volume level for the at least one front speaker and the third speaker and a greater delay time applied to the sound signals for the at least one front speaker with respect to the third speaker;

a fourth setting comprising a same phase and sound volume level for the at least one front speaker and the third speaker and a greater delay time applied to the sound signals of the third speaker with respect to the sound signals for the at least one front speaker;

a fifth setting comprising a same delay time and sound volume level for the sound signal for the at least one front speaker and the third speaker and opposite phases for the sound signals for the at least one front speaker and the third speaker;

a sixth setting comprising opposite phases and a same volume level for the sound signals for the at least one front speaker and the third speaker and a greater delay time applied to the sound signals for the at least one front speaker with respect to the sound signals of the third speaker; and a seventh setting comprising opposite phases and a same volume level for the sound signals from the at least one front speaker and the third speaker and a greater delay time applied to the sound signals for the third speaker with respect to the sound signals for the at least one front speaker.

17. The electronic musical instrument of claim 11, further comprising:

a third localized sound processing section for receiving left and right channel signals of tone signals assigned as third localized sounds and producing a third group of sound signals to at least two of the first speaker, the second speaker and the third speaker to form a third sound image.

18. The electronic musical instrument of claim 17, wherein the first, second, and third adders further mix the third group of sound signals produced by the third localized sound processing section.

19. The electronic musical instrument of claim 17, wherein the second sound image is further away from the first sound image with respect to the perspective of the performer at the electronic musical instrument, and wherein the third sound image is between the first and the second sound images.

20. The electronic musical instrument of claim 11, wherein the third speaker is positioned at the left side of the back side and wherein the planar surface further includes a fourth speaker positioned on the back side and the right side with respect to the perspective of the performer, wherein the first and second localized sound processing sections produce the first and the second groups of sound signals to the first speaker, the second speaker, the third speaker, and the fourth speaker, further comprising:

a third localized sound processing section for receiving left and right channel signals of tone signals assigned as third localized sounds and producing a third group of sound signals to the first, second, third, and fourth speakers to form a third sound image.

21. The electronic musical instrument of claim 20, wherein the first, second, and third adders further mix the sounds produced by the third localized sound processing section, further comprising:

a fourth adder to mix the first, second and third groups of sound signals produced by the first, second, and third localized sound processing sections to produce a fourth group of sound signals to output to the fourth speaker.

22. The electronic musical instrument of claim 20, wherein the second sound image is further away from the first sound image with respect to the perspective of the performer at the electronic musical instrument, and wherein the third sound image is between the first and second sound images.

23. A method for producing sounds from an electronic musical instrument having a front side, back side, right side, and left side with respect to a perspective of a performer of the electronic musical instrument, comprising:

receiving left and right channel signals of tone signals assigned as first localized sounds;

a first processing of the received left and right channel signals assigned as the first localized sounds and applying first adjustments to the left and the right channel signals to produce a first group of sound signals to at least two of a first speaker, a second speaker and a third speaker on a planar surface to form a first sound image, wherein the first speaker is positioned on the front side and the left side, the second speaker positioned on the front side and the right side, and the third speaker positioned on the back side;

receiving the left and the right channel signals of tone signals assigned as second localized sounds; and a second processing of the received left and right channel signals assigned as the second localized sounds and applying second adjustments, different from the first adjustments, to the left and the right channel signals to produce a second group of sound signals, different from the first group of signals, to at least two of the first speaker, the second speaker and the third speaker to form a second sound image, wherein the first processing and the second processing process the left and right channel signals independent of the processing by the second processing and the first processing, respectively, to produce the different first and second group of sound signals.

24. The method of claim 23, further comprising:

mixing the first group of sound signals produced by the first localized sound processing section and the second group of sound signals produced by the second localized sound processing section to produce first sound signals to output to the first speaker;

mixing the first group of sound signals produced by the first localized sound processing section and the second group of sound signals produced by the second localized sound processing section to produce second sound signals to output to the third speaker; and mixing the first group of sound signals produced by the first localized sound processing section and the second group of sound signals produced by the second localized sound processing section to produce third sound signals to output to the third speaker.

25. The method of claim 23, further comprising:

rendering delay, volume adjustment, phase adjustment, and filter processing on the received left and right channel signals to produce the first and second groups of sound signals.

26. The method of claim 23, further comprising:

implementing a plurality of settings, wherein each setting provides at least one different value from other of the settings for at least one of sound volume levels, phases, and delays for the sound signals, wherein each setting results in different shapes and positions of the first and second sound images produced by the first and second localized sound processing sections.

27. The method of claim 26, wherein the settings for at least one front speaker, comprising at least one of the first speaker and the second speaker, and the third speaker include at least one of the settings that are a member of a set of settings comprising:

a first setting comprising a sound volume level of the at least one front speaker that is less than a sound volume level of the third speaker and a same delay time and phase for the sound signals for the at least one front speaker and the third speaker;

a second setting comprising a sound volume level of the at least one front speaker that is greater than a sound volume level of the third speaker and a same delay time and phase for the sound signals for the at least one front speaker and the third speaker;

a third setting comprising a same phase and sound volume level for the at least one front speaker and the third speaker and a greater delay time applied to the sound signals for the at least one front speaker with respect to the third speaker;

a fourth setting comprising a same phase and sound volume level for the at least one front speaker and the third speaker and a greater delay time applied to the sound signals of the third speaker with respect to the sound signals for the at least one front speaker;

a fifth setting comprising a same delay time and sound volume level for the sound signal from the at least one front speaker and the third speaker and opposite phases for the sound signals for the at least one front speaker and the third speaker;

a sixth setting comprising opposite phases and a same volume level for the sound signals for the at least one front speaker and the third speaker and a greater delay time applied to the sound signals for the at least one front speaker with respect to the sound signals for the third speaker; and a seventh setting comprising opposite phases and a same volume level for the sound signals for the at least one front speaker and the third speaker and a greater delay time applied to the sound signals for the third speaker with respect to the sound signals for the at least one front speaker.

28. The method of claim 23, further comprising:

receiving left and right channel signals of tone signals assigned as third localized sounds; and processing the received left and right channel signals assigned as the third localized sounds to produce a third group of sound signals to at least two of the first speaker, the second speaker and the third speaker to form a third sound image.

29. The method of claim 28, further comprising:

mixing the third localized sound signals with the first and second localized sound signals.

30. The method of claim 28, wherein the second sound image is further away from the first sound image with respect to the perspective of the performer at the electronic musical instrument, and wherein the third sound image is between the first and the second sound images.

31. The method of claim 23, wherein the third speaker is positioned at the left side of the back side and wherein the planar surface further includes a fourth speaker positioned on the back side and the right side with respect to the perspective of the performer, wherein the first and second localized sound processing sections produce sounds to the first speaker, the second speaker, the third speaker, and the fourth speaker, further comprising:

receiving left and right channel signals of tone signals assigned as third localized sounds;

processing the received left and right channel signals assigned as the third localized sounds to produce a third group of sound signals to the first, second, third, and fourth speakers to form a third sound image.

32. The method of claim 31, further mixing the third localized sounds with the first, second and third localized sounds.

33. The method of claim 31, wherein the second sound image is further away from the first sound image with respect to the perspective of the performer at the electronic musical instrument, and wherein the third sound image is between the first and second sound images.

* * * * *